United States Patent
Gao et al.

(10) Patent No.: US 11,469,871 B2
(45) Date of Patent: Oct. 11, 2022

(54) SIGNALING OF SRS RESOURCES FOR PUSCH RATE MATCHING

(71) Applicant: Telefonaktiebolaget LM Ericsson (publ), Stockholm (SE)

(72) Inventors: Shiwei Gao, Nepean (CA); Mattias Frenne, Uppsala (SE); Stephen Grant, Pleasanton, CA (US); Robert Mark Harrison, Grapevine, TX (US); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 171 days.

(21) Appl. No.: 16/619,579

(22) PCT Filed: Mar. 23, 2018

(86) PCT No.: PCT/IB2018/052000
§ 371 (c)(1),
(2) Date: Dec. 5, 2019

(87) PCT Pub. No.: WO2018/173000
PCT Pub. Date: Sep. 27, 2018

(65) Prior Publication Data
US 2020/0169369 A1   May 28, 2020

Related U.S. Application Data

(60) Provisional application No. 62/476,253, filed on Mar. 24, 2017.

(51) Int. Cl.
*H04L 5/00* (2006.01)
*H04B 1/7143* (2011.01)
*H04W 72/04* (2009.01)

(52) U.S. Cl.
CPC ......... *H04L 5/0053* (2013.01); *H04B 1/7143* (2013.01); *H04L 5/0007* (2013.01);
(Continued)

(58) Field of Classification Search
CPC ... H04L 5/0053; H04L 5/0007; H04L 5/0048; H04L 5/0094; H04L 5/005; H04L 5/008; H04B 1/7143; H04W 72/0413
See application file for complete search history.

(56) References Cited

U.S. PATENT DOCUMENTS

2007/0218915 A1* 9/2007 Yang .................. H04L 5/023
455/450
2015/0003351 A1* 1/2015 Park .................. H04L 5/0044
370/329

(Continued)

OTHER PUBLICATIONS

Invitation to Pay Additional Fees and, Where Applicable, Protest Fee dated Jun. 13, 2018 issued in PCT Application No. PCT/IB2018/052000, consisting of 15 pages.
(Continued)

*Primary Examiner* — Dady Chery
(74) *Attorney, Agent, or Firm* — Christopher & Weisberg, P.A.

(57) ABSTRACT

User equipment, base station and methods are provided for user equipment uplink data transmission to a base station. In one embodiment, the user equipment includes receiving circuitry configured to receive signaling information in an uplink data grant about unavailable resource elements in a uplink subframe for uplink data transmission over a Physical Uplink Shared Channel (PUSCH) indicated by the data grant and processing circuitry configured to transmit the PUSCH on only available resource elements in the subframe.

19 Claims, 19 Drawing Sheets

(52) U.S. Cl.
CPC .......... *H04L 5/0048* (2013.01); *H04L 5/0094* (2013.01); *H04W 72/0413* (2013.01)

(56) References Cited

U.S. PATENT DOCUMENTS

2016/0150529 A1   5/2016   Noh et al.
2016/0295526 A1   10/2016  Park et al.

OTHER PUBLICATIONS

International Search Report and Written Opinion of the International Searching Authority dated Aug. 13, 2018 issued n PCT Application No. PCT/IB2018/052000, consisting of 21 pages.
Notification Concerning Transmittal of International Preliminary Report on Patentability dated Oct. 3, 2019 issued in PCT Application No. PCT/IB2018/052000, consisting of 13 pages.
3GPP TR 38.802 V1.2.0 (Feb. 2017) 3rd Generation Partnership Project; Technical Specification Group Radio Access Network; Study on New Radio (NR) Access Technology; Physical Layer Aspects (Release 14), consisting of 83 pages.
3GPP TR 36.211 V14.1.0 (Dec. 2016) 3rd Generation Partnership Project; Technical Specification Group Radio Access Network; Evolved Universal Terrestrial Radio Access (E-UTRA); Physical Channels and Modulation (Release 14), consisting of 175 pages.
3GPP TR 36.213 V14.1.0 (Dec. 2016) 3rd Generation Partnership Project; Technical Specification Group Radio Access Network; Evolved Universal Terrestrial Radio Access (E-UTRA); Physical Layer Procedures (Release 14), consisting of 414 pages.

\* cited by examiner

SIGNALING OF SRS RESOURCES FOR PUSCH RATE MATCHING

CROSS-REFERENCE TO RELATED APPLICATIONS

This application is a Submission Under 35 U.S.C. § 371 for U.S. National Stage Patent Application of International Application No.: PCT/IB2018/052000, filed Mar. 23, 2018 entitled "SIGNALING OF SRS RESOURCES FOR PUSCH RATE MATCHING," which claims priority to U.S. Provisional Application No. 62/476,253, filed Mar. 24, 2017, entitled "DYNAMIC SIGNALING OF SRS RESOURCES FOR PUSCH RATE MATCHING," the entireties of both of which are incorporated herein by reference.

FIELD

The disclosure relates to wireless communications, and, in particular, to signaling of sounding reference symbol (SRS) resources for Physical Uplink Shared Channel (PUSCH) rate matching.

BACKGROUND

The next generation mobile wireless communication system (5G) or new radio (NR), will support a diverse set of use cases and a diverse set of deployment scenarios. The diverse set of deployment scenarios includes deployment at both low frequencies (100s of MHz), similar to existing LTE systems, and very high frequencies (mm waves in the tens of GHz).

Similar to LTE, NR will use OFDM (Orthogonal Frequency Division Multiplexing) in both the downlink (i.e., from a network node, or gNodeB (gNB), to a wireless device such as a user equipment or UE) and uplink (i.e., from the wireless device to the network node). This scheme is also referred to, in this case, as CP-OFDM (Cyclic Prefix OFDM). In the uplink, additionally DFT-spread OFDM (DFT-S-OFDM) will also be supported. DFT-S-OFDM is also referred to as Single Carrier FDMA (SC-FDMA) in LTE.

The basic NR physical resource can thus be seen as a time-frequency grid similar to the one in LTE as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. FIG. 1 is a diagram of LTE physical resources. The supported subcarrier spacing values (also reference to as different numerologies) in NR are given by $\Delta f=(15\times 2^\alpha)$ kHz where $\alpha$ is a non-negative integer.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency.

In the time domain, downlink and uplink transmissions in NR will be organized into equally-sized subframes similar to LTE as shown in FIG. 2. FIG. 2 is a diagram of LTE time-domain structure with 15 kHz subcarrier spacing. In NR, the subframe length is 1 ms for all supported numerologies. A subframe is further divided into a number of slots of equal duration. There is one 14-symbol slot, or two 7-symbol slots per subframe for 15 kHz subcarrier spacing. For subcarrier spacing greater than 15 kHz, there are more than 2 slots per subframe. For convenience, the term "subframe" is used throughout the following description. However, it is understood that in NR, data or reference signal transmission can also be in a per slot basis and the discussions based on subframes are equally applicable to slots.

Downlink transmissions in LTE or NR are dynamically scheduled, i.e., in each subframe or slot the network node transmits downlink control information (DCI) about which wireless device data is to be transmitted to and which resource blocks in the current downlink subframe the data is transmitted on. This control signaling is typically transmitted in the first one or two OFDM symbols in each subframe in LTE and each slot in NR. The downlink control information (DCI) is carried on the Physical Control Channel (PDCCH) and data is carried on the Physical Downlink Shared Channel (PDSCH). The wireless device first detects and decodes the PDCCH and, if a PDCCH is decoded successfully, the wireless device decodes the corresponding PDSCH based on the decoded control information in the PDCCH.

Uplink data transmissions are also dynamically scheduled using the PDCCH. Similar to downlink, the wireless device first decodes uplink grants in the PDCCH and then transmits data over the Physical Uplink Shared Channel (PUSCH) based on the decoded control information in the uplink grant such as modulation order, coding rate, uplink resource allocation, and etc.

In addition to the PUSCH, Physical Uplink Control Channel (PUCCH) is also supported in NR to carry uplink control information (UCI) such as HARQ (Hybrid Automatic Repeat Request) related Acknowledgements (ACK), Negative Acknowledgements (NACK), and Channel State Information (CSI) feedback.

Although many details of NR PUCCH are still to be determined, it is envisioned that, similar to LTE, PUCCH resources will be pre-allocated in a cell and shared by all wireless devices.

SRS in LTE

The sounding reference signal (SRS) is used for uplink channel quality measurements for frequency-selective scheduling and link adaption. SRS is also used for uplink timing estimation.

In LTE, SRS is only transmitted by wireless device in the last OFDM symbol of a subframe configured for SRS transmission for the wireless device. The location of SRS in a PRB in a SRS subframe is shown in FIG. 3, where DMRS (DeModulation Reference Signal) are used for channel estimation for PUSCH demodulation. FIG. 3 is a diagram of SRS location in a PRB of a SRS subframe.

The subframes in which SRS transmission can occur in a cell is referred to as cell specific SRS subframes. The wireless device can be configured to transmit SRS on a subset of the cell specific SRS subframes. The subset of subframes are referred to as wireless device specific SRS subframes. An example is shown in FIG. 4. FIG. 4 is a diagram of an example of cell specific and wireless device specific SRS subframes.

The wireless device can be configured with different SRS bandwidths. In general, two kinds of sounding bandwidth are supported, one is wideband and the other is narrow band. In case of wideband, channel measurement over the full system bandwidth can be performed in a single subframe. While in narrow band sounding, only part of the full system bandwidth can be measured in a subframe, thus multiple SRS subframes are needed for a full bandwidth channel measurement. Frequency hopping is supported for narrowband SRS so that different part of the frequency band can be measured in different subframes.

Furthermore, two types of sounding are supported, periodic (also referred to as type 0) and aperiodic (also referred to as type 1). In case of periodic SRS, a wireless device transmits SRS periodically at certain configured SRS subframes. In case of aperiodic SRS, a wireless device transmits SRS only when it is requested by a network node. The SRS subframes for periodic and aperiodic SRS are separately configured for a wireless device, both are subsets of the cell specific SRS subframes.

The SRS bandwidth for a wireless device is configurable and is in the multiple of 4 PRBs. The minimum SRS bandwidth is 4 PRBs. An example is shown in FIG. 5. FIG. 5 is a diagram of an example of wideband and narrowband SRS with 10 MHz system bandwidth.

In case of narrowband SRS with frequency hopping (FH), a SRS is transmitted on different part of the system bandwidth at different SRS subframes. For example, for a 10 MHz system and SRS bandwidth of 4 PRBs, a possible set of locations in the frequency domain for SRS transmission are shown in FIG. 6. FIG. 6 is an example of s set of locations for SRS transmission with four PRB bandwidth. In this example, the whole bandwidth can be measured after 12 SRS subframes.

A SRS signal is a phase-shifted Zadoff-Chu sequence. Different wireless devices can be multiplexed on the same time-frequency resources by assigning different phase shifts, known as cyclic shifts (CS). There are eight cyclic shifts defined. In addition, a SRS signal is only transmitted on half of the subcarriers in the configured SRS bandwidth, either even-numbered or odd-numbered subcarriers, configurable through a parameter called comb. Therefore, up to sixteen wireless devices can be multiplexed on the same SRS bandwidth. In LTE third Generation Partnership Project (3GPP) Release 8 (Rel.8) to 3GPP Release 12 (Rel.12), 2-comb is supported, meaning every other subcarrier.

In LTE 3GPP Release 13 (Rel.13), support for 4-comb was introduced, which means that a SRS signal can be mapped to every fourth subcarrier, thereby increasing the SRS multiplexing capacity provided that the channel is sufficiently flat so that every fourth subcarrier is adequate.

Wireless devices with different SRS bandwidths can be multiplexed on a SRS subframe with different comb values. Wireless devices with the same SRS bandwidth can be multiplexed in a SRS subframe with different cyclic shifts.

PUSCH rate matching:

PUSCH rate matching refers to the process in determining the available resource elements (REs) in a subframe for carrying PUSCH data. The available REs in an uplink subframe can be different depending on the following factors:

Whether or not the subframe is also a cell specific SRS subframe;

Maximum cell wide SRS bandwidth; and

Scheduled PUSCH bandwidth and PRB location.

When SRS is not configured as a cell specific SRS subframe, then the available REs for a PUSCH can be easily calculated as a product of the number of PRBs scheduled and the number of REs in a PRB. For normal cyclic prefix, the number of REs available per PRB equals to 12 SC-FDMA symbols times 12 subcarriers=144.

However, when the subframe is also a cell specific SRS subframe, the number of available of REs per PRB can vary. An example is shown in FIG. 7. FIG. 7 is a diagram of three different scenarios of PUSCH scheduled in a subframe with SRS. In scenario (a), the PUSCH PRBs are fully overlapped with the SRS. In this case, the last SC-FDMA symbol have to be removed from the calculation of available PUSCH REs, or rate matched around the SRS. In scenario (b), PUSCH is partially overlapped with SRS and in this case, the last SC-FDMA symbol is also removed from the calculation of available PUSCH REs in LTE. In scenario (c), there is no overlap between PUSCH and SRS. In this case, there are further two possible scenarios: (1) the wireless device scheduled with PUSCH does not transmit SRS in the subframe in this case the last SC-FDMA symbol is counted in the calculation of available PUSCH REs; (2) the wireless device scheduled with PUSCH is also scheduled to transmit SRS in the subframe, then the last SC-FDMA symbol is considered unavailable.

Since both the subframes for SRS transmission and the maximum SRS bandwidth in a cell are signalled to all wireless devices semi-statically. A wireless device can perform PUSCH rate matching when a PUSCH is scheduled in a subframe.

SRS in NR

SRS will also be supported in NR for uplink channel sounding. Similar to LTE, configurable SRS bandwidth is supported. SRS can be configurable with regard to density in frequency domain (e.g., comb levels) and/or in time domain (including multi-symbol SRS transmissions).

In addition to full band size, partial band size is also supported in NR, which is smaller than the largest transmission bandwidth supported by the wireless device. For the full band size, the size is equal to the largest transmission bandwidth supported by the wireless device.

Aperiodic SRS transmission triggered by the network is supported in NR. The triggering is generally done through DCI dynamically. Periodic and semi-persistent NR-SRS transmissions are also supported in NR.

In NR, a SRS resource comprises of a set of resource elements (REs) within a time duration and frequency span and N antenna ports (N≥1). A wireless device can be configured with K≥1 NR-SRS resources. The maximum value of K is considered to be a wireless device capability.

Out of K≥1 configured NR-SRS resources, for aperiodic transmission, the wireless device can be configured to transmit a subset of or all K NR-SRS resources.

For periodic and semi-persistent transmission, out of K≥1 configured SRS resources, the wireless device can be configured to transmit K SRS resources.

SUMMARY

Some embodiments advantageously provide a method, network node and wireless device for dynamic signaling of sounding reference signal (SRS) resources for Physical Uplink Shared Channel (PUSCH) rate matching.

Similar to LTE, SRS will also be defined in NR for Uplink channel sounding. However, a SRS may be dynamically triggered through DCI to be transmitted in any uplink slot (fully dynamic, aperiodic SRS triggering). The SRS bandwidth that the wireless device shall use for SRS transmission may also be dynamically signaled. This would allow for better system flexibility and uplink resource utilization.

A problem with such flexible and dynamic SRS transmission is the PUSCH rate matching. When the wireless device is scheduled with PUSCH in a slot, the rate matching procedure in LTE based on a semi-statically signaled cell specific SRS subframe, and bandwidth cannot be used. This is a problem.

Some of the embodiments according to the present disclosure may solve none, some or all the described problems with existing systems, and/or other problems. In one solution according to present disclosure, when a wireless device is scheduled with PUSCH in a slot, the wireless device is additionally dynamically indicated in the same DCI that carries the UL grant for the PUSCH as to whether one or multiple SRS resources are present in the same slot, and if present, the SRS resource configurations. In case the PUSCH resource allocation overlaps with the SRS resource(s), then the wireless device assumes that the REs of these one or multiple SRS resources are not available for the PUSCH. A zero power (ZP) SRS can be configured for a wireless device and used to indicate the REs over which the wireless device should not transmit anything in a subframe. Instead of signalling the one or multiple SRS resources, ZP SRS can be signalled and used for PUSCH rate matching.

In a second solution according to present disclosure, which aims at solving, for example, the problem assuming that a CP-OFDM or DFT-S-OFDM symbol in a subframe or a slot can be used for SRS transmission for all wireless devices, the presence of a SRS transmission in the CP-OFDM or DFT-S-OFDM symbol in a subframe is dynamically signalled to a wireless device that has PUSCH scheduled in the same subframe. The dynamic signaling can be in the form of one bit per CP-OFDM or DFT-S-OFDM symbol in the same DCI that carries the uplink grant for the PUSCH. When the presence of SRS is indicated, the wireless device assumes the whole CP-OFDM or DFT-S-OFDM symbol is unavailable for the PUSCH transmission.

In a third solution according to present disclosure, in addition to signaling the SRS presence in a subframe, the information about the SRS subbands is also dynamically signaled to the wireless devices so that the REs in the subbands not overlapping with SRS can be used for PUSCH transmission. This may be particularly applicable to CP-OFDM where PAPR is not a concern. The information can be signalled as a bitmap in the same DCI that carries the UL grant scheduling the PUSCH and each bit is mapped to a SRS subband.

In a fourth solution according to present disclosure, similar to the third solution, a bitmap is dynamically signalled to a wireless device when it is scheduled with a PUSCH. However, the size of the bitmap can be configurable by the higher layers, and each bit corresponds to a portion of the system bandwidth.

In a fifth solution according to present disclosure, which aims to solve, for example, the problem assuming that frequency hopping is enabled for SRS in a subframe or a slot, information about the hoping pattern is dynamically signalled to a wireless device to indicate that those SRS resources are unavailable for PUSCH transmission.

In the first to the fifth solutions, the SRS resources indicated to wireless devices are about SRS transmitted by other wireless devices. In a sixth solution according to present disclosure, which aims to solve, for example, the problem when SRS is transmitted by the same wireless device in the same uplink subframe as PUSCH, the REs in the same resource block as SRS but on different subcarriers are allowed for PUSCH transmission.

According to one aspect, in some embodiments, a user equipment for uplink data transmission to a base station is provided. The user equipment includes receiving circuitry configured to receive signaling information in an uplink data grant about unavailable resource elements in a uplink subframe for uplink data transmission over a Physical Uplink Shared Channel (PUSCH) indicated by the data grant and processing circuitry configured to transmit the PUSCH on only available resource elements in the subframe. In some embodiments, the information about the unavailable resource elements includes a bitmap with each bit associated with one SRS resource configuration. In some embodiments, the information about the unavailable resource elements includes an indication of at least one Orthogonal Frequency Division Multiplexing (OFDM) symbol. In some embodiments, the information about the unavailable resource elements includes at least one of a bitmap with each bit associated with a SRS subband and a bitmap indicating OFDM symbols. In some embodiments, the size of the bitmap is configurable by a Radio Resource Control signaling. In some embodiments, the information about the unavailable resource elements includes an indication of a SRS hopping pattern. In some embodiments, the information about the unavailable resource elements includes an indication of at least one of a SRS hopping pattern and a bitmap indicating OFDM symbols containing SRS. In some embodiments, the processing circuitry is further configured to determine available resource elements (REs) for the PUSCH in OFDM symbols containing any SRS resource. In some embodiments, the indicated resources for uplink sounding reference signals (SRS) are for at least one other user equipment and the processing circuitry is further configured to treat the SRS resources as zero transmit power resources.

According to another aspect, in some embodiments, a method for a user equipment for uplink data transmission to a base station is provided. The method includes receiving signaling information in an uplink data grant about unavailable resource elements in a uplink subframe for uplink data transmission over a Physical Uplink Shared Channel (PUSCH) indicated by the data grant and transmitting the PUSCH using only available resource elements in the subframe. In some embodiments, the information about the unavailable resource elements includes a bitmap with each bit associated with one SRS resource configuration. In some embodiments, information about the unavailable resource elements includes an indication of at least one Orthogonal Frequency Division Multiplexing (OFDM) symbol configured with SRS. In some embodiments, the information about unavailable resource elements includes at least one of a bitmap with each bit associated with a SRS subband and a bitmap indicating ate least one OFDM symbol. In some embodiments, the size of the bitmap is configurable by radio resource control (RRC) signaling. In some embodiments, the information about the unavailable resource elements includes an indication of a SRS hopping pattern. In some embodiments, the information about the unavailable resource elements includes an indication of at least one of a SRS hopping pattern and a bitmap indicating OFDM symbols containing SRS. In some embodiments, the method further includes determining available resource elements (REs) in OFDM symbols containing any SRS resource. In some embodiments, the SRS resources are for at least one other user equipment served by the same base station and are zero transmit power resources. According to another aspect, in some embodiments, a base station for receiving uplink data transmission in a wireless network is provided. The base station includes processing circuitry configured to signal information to a user equipment in an uplink data grant about unavailable resources in a uplink subframe for uplink data transmission over a Physical Uplink Shared Channel (PUSCH) indicated by the data grant and receiver circuitry configured to receive the PUSCH from the user equipment according to the signaled uplink data grant information.

In some embodiments, the information about the unavailable resource elements includes a bitmap with each bit associated with one SRS resource configuration. In some embodiments, the information about the unavailable resource elements includes an indication of at least one OFDM symbol configured with SRS. In some embodiments, the information about the unavailable resource elements includes a bitmap with each bit associated with a SRS subband, and/or an indication of a zerotransmission power in the associated SRS subband in at least one OFDM symbol. In some embodiments, the size of the bitmap is configurable by radio resource control (RRC) signaling. In some embodiments, the information about the unavailable resource elements includes an indication of a SRS hopping pattern. In some embodiments, the information about the unavailable resource elements includes an indication of at least one of a SRS hopping pattern and a bitmap indicating OFDM symbols containing SRS. In some embodiments, the SRS resources are for at least one other user equipment served by the base station.

According to another aspect, in some embodiments, a method for base station for receiving uplink data transmission in a wireless network is provided. The method includes signaling information to the user equipment in an uplink data grant about unavailable resource elements in a uplink subframe for uplink data transmission over a Physical Uplink Shared Channel (PUSCH) indicated by the data grant receiving the PUSCH from the user equipment according to the signaled uplink data grant information. In some embodiments, the information about the unavailable resource elements includes a bitmap with each bit associated with one SRS resource configuration. In some embodiments, the information about the unavailable resource elements includes an indication of at least one OFDM symbol configured with SRS. In some embodiments, the information about the unavailable resource elements includes a bitmap with each bit associated with a SRS subband; and/or an indication of configuration of a zero transmission power in the associated SRS subband in at least one OFDM symbol. In some embodiments, the size of the bitmap is configurable by radio resource control (RRC). In some embodiments, the information about the unavailable resource elements includes an indication of a SRS hopping pattern. In some embodiments, the information about the unavailable resource elements includes an indication of at least one of a SRS hopping pattern and a bitmap indicating OFDM symbols containing SRS. In some embodiments, the unavailable resource elements are SRS resources for at least one other user equipment served by the base station.

According to another aspect, in some embodiments, a user equipment for uplink data transmission to a base station is provided. The user equipment includes a receiving module configured to receive signaling information in an uplink data grant about unavailable resource elements in a uplink subframe for uplink data transmission over a Physical Uplink Shared Channel (PUSCH) indicated by the data grant and a resources module configured to transmit the PUSCH using only available resource elements.

According to another aspect, in some embodiments, a base station for receiving uplink data transmission in a wireless network is provided. The base station includes signaling module configured to signaling information to the user equipment in an uplink data grant about unavailable resource elements in a uplink subframe for uplink data transmission over a Physical Uplink Shared Channel (PUSCH) indicated by the data grant and receiving module configured to receive the PUSCH from the user equipment according to the signaled uplink data grant information.

In some embodiments, the resource elements are for sounding reference signals (SRS).

In some embodiments, the resource elements are for sounding reference signals (SRS transmissions from at least a second user equipment in the uplink slot.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
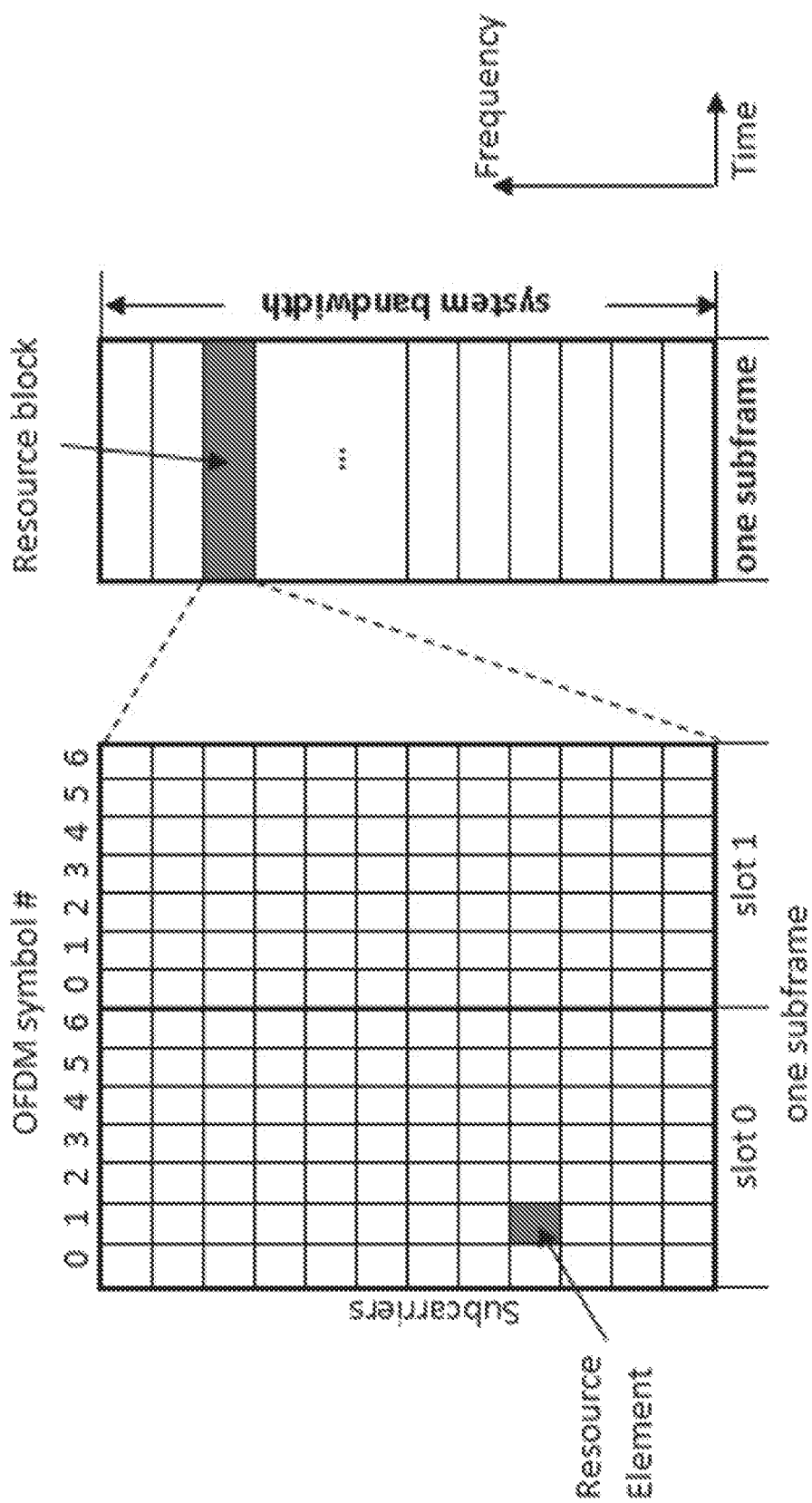
FIG. 1 is a diagram of LTE physical resources.
Figure 2:
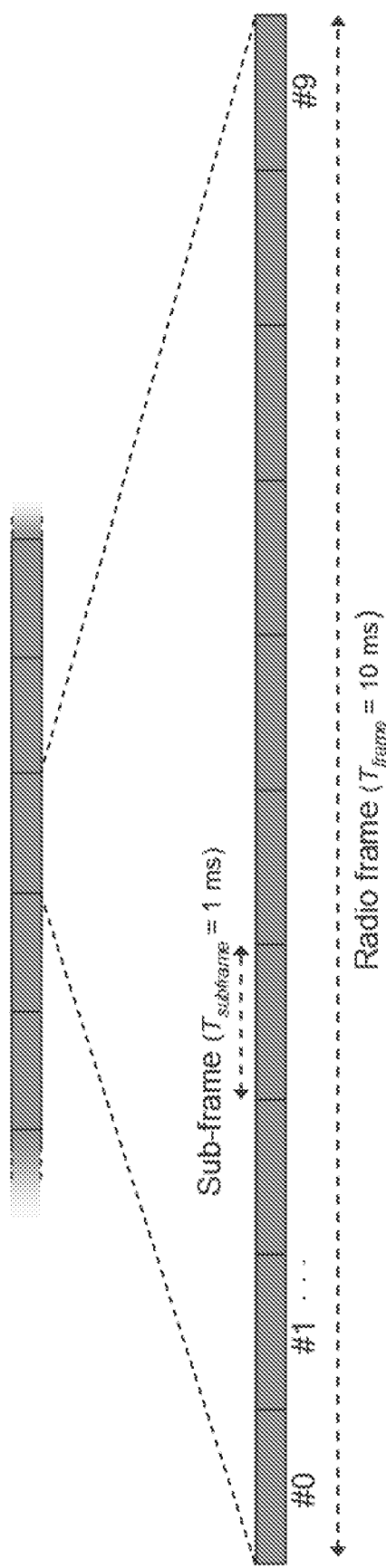
FIG. 2 is a diagram of LTE time-domain structure with 15 kHz subcarrier spacing.
Figure 3:
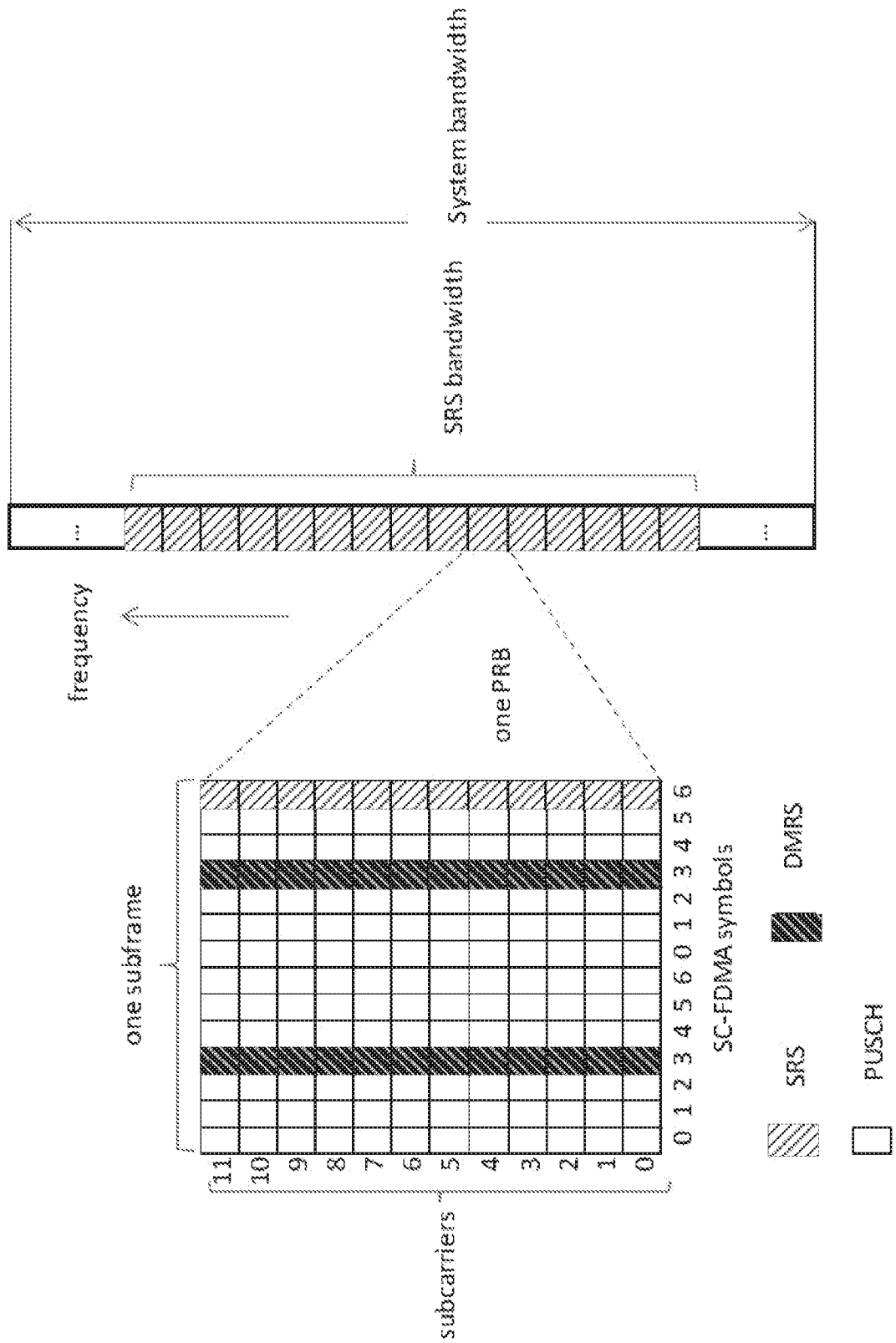
FIG. 3 is a diagram of SRS location in a PRB of a SRS subframe.
Figure 4:
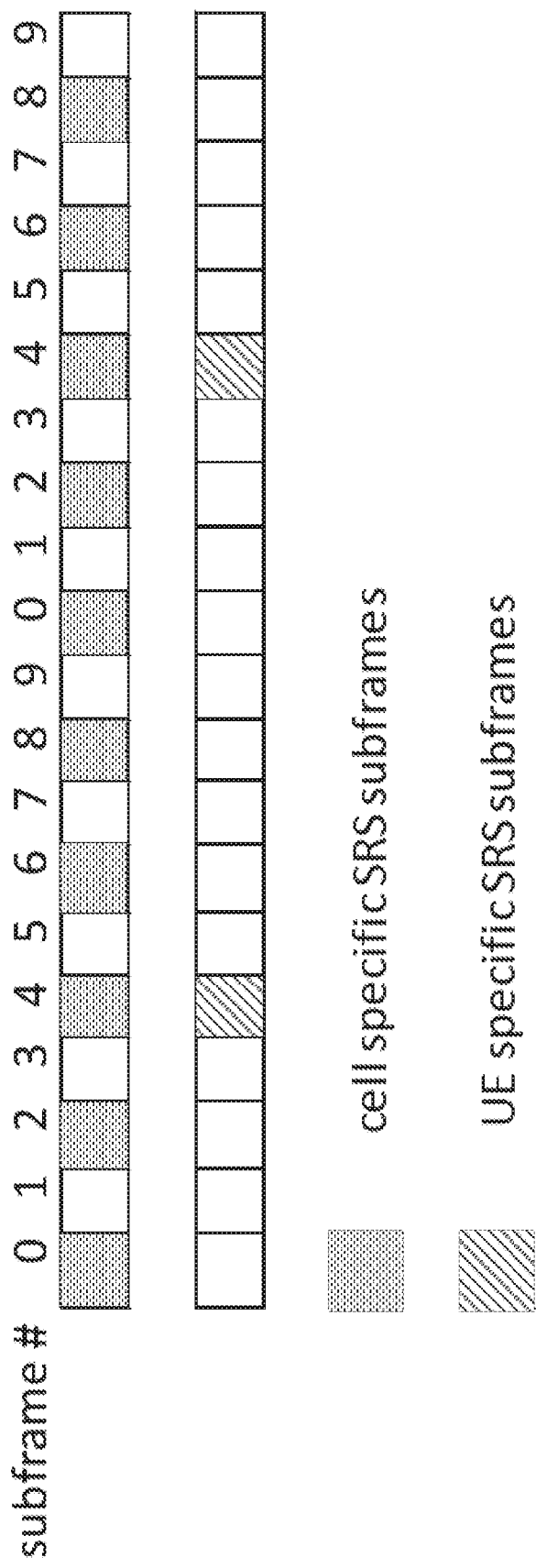
FIG. 4 is a diagram of an example of cell specific and wireless device specific SRS subframes.
Figure 5:
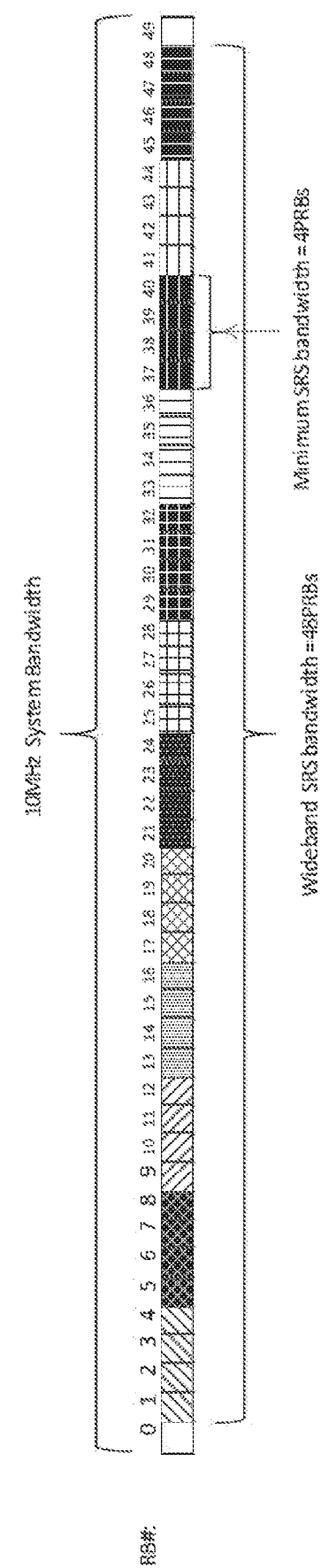
FIG. 5 is a diagram of an example of wideband and narrowband SRS with 10 MHz system bandwidth.
Figure 6:
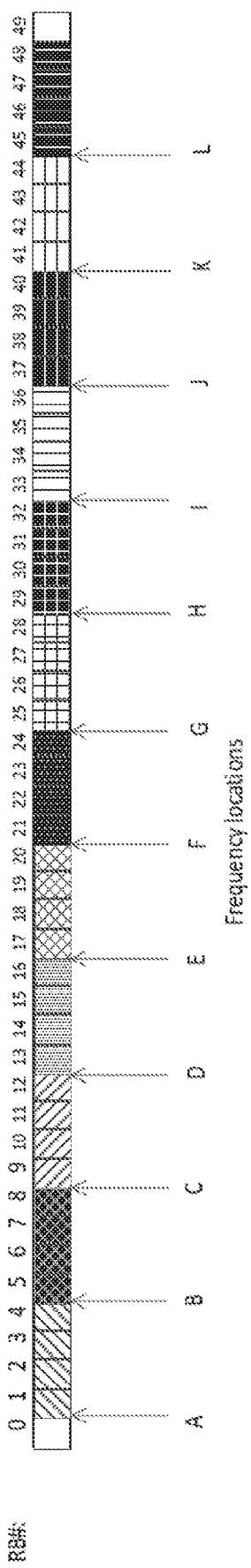
FIG. 6 is an example of s set of locations for SRS transmission with four PRB bandwidth.
Figure 7:
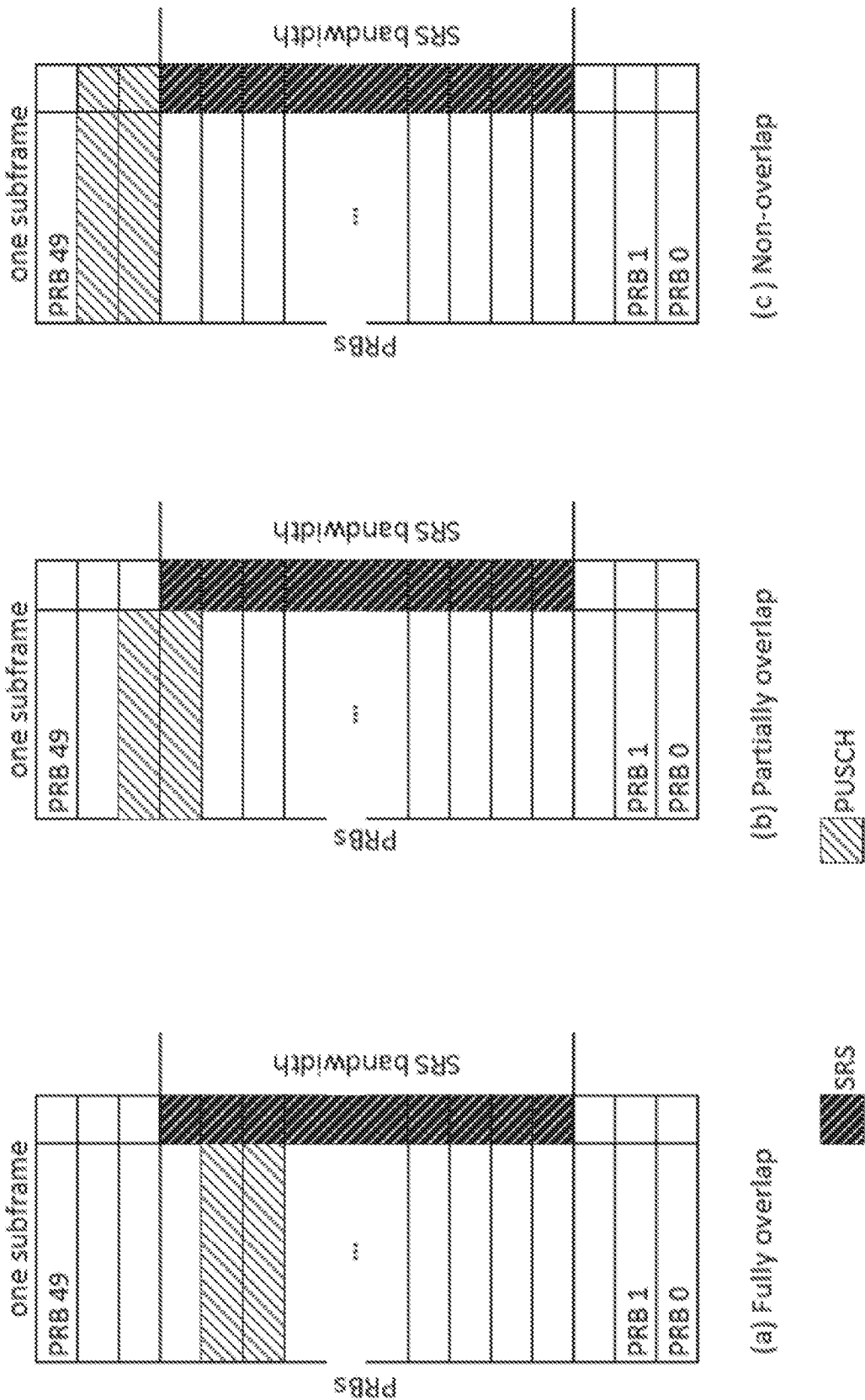
FIG. 7 is a diagram of three different scenarios of PUSCH scheduled in a subframe with SRS.

One benefit that may be provided by some embodiments according to the present disclosure is that PUSCH rate matching can be done dynamically with dynamic SRS transmission. Solution 1 is more flexible as further detailed below (e.g. in reference with FIG. 11) and can be used in the case that SRS is transmitted in more than one OFDM/DFT-S-OFDM symbols and with different subbands in each symbol. Solution 2 has a small DCI overhead and could be used, for example, in the case where SRS is transmitted in only one OFDM/DFT-S-OFDM symbol. Solution 3 can be more efficient in terms of uplink resource utilization comparing with Solution 2, but with more DCI overhead. Solution 4 can be seen, in some cases, as a tradeoff between solution 1 and solution 2. Solution 5 could, for example, be suitable when SRS frequency hopping in a slot or a subframe is configured. Finally, Solution 6 may, for example, improve uplink resource utilization when both PUSCH and SRS are transmitted in the same subframe by a wireless device.

Before describing in detail exemplary embodiments, it is noted that the embodiments reside primarily in combinations of apparatus components and processing steps related to methods, wireless devices and nodes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 8:
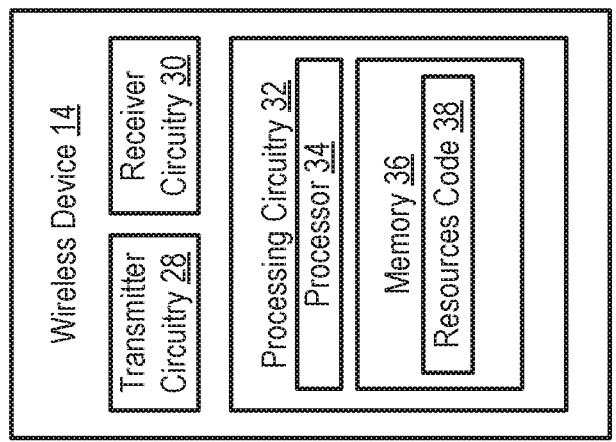
FIG. 8 is a block diagram of an exemplary system for signaling of resources in accordance with some of the principles of the disclosure.
Figure 8:
Figure 8:
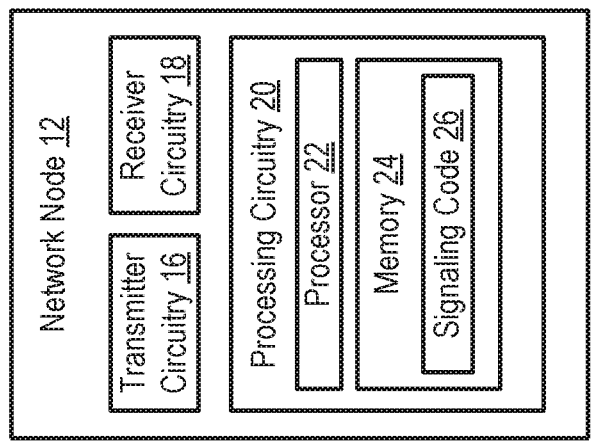

Referring now to drawing figures in which like reference designators refer to like elements there is shown in FIG. 8 is a block diagram of an exemplary system for signaling of resources in accordance with the principles of the disclosure. System 10 includes one or more network nodes 12 and one or more wireless devices 14, in communication with each other via one or more communication networks, paths and/or links using one or more communication protocols as described herein.

Network node 12 includes transmitter circuitry 16 and receiver circuitry 18 for communicating with wireless device 14, other nodes 12 and/or other entities in system 10. In one or more embodiments, transceiver circuitry 16 and/or receiver circuitry 18 include and/or is/are replaced by one or more communication interfaces. Network node 12 includes processing circuitry 20. The term "network node", such as "network node 12" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, gNB, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling and/or processes to be performed, e.g., by network node 12. Processor 22 corresponds to one or more processors 22 for performing network node 12 functions described herein. Network node 12 includes memory 24 that is configured to store data, programmatic software code and/or other information described herein. In one or more embodiments, memory 24 is configured to store signaling code 26. For example, signaling code 26 includes instructions that, when executed by processor 22, causes processor 22 to perform the functions described herein such as the functions described with respect to FIGS. 9A and 9B.

Wireless device 14 includes transmitter circuitry 28 and receiver circuitry 30 for communicating with network node 12, other wireless devices 14 and/or other entities in system 10. In one or more embodiments, transmitter circuitry 28 and/or receiver circuitry 30 include and/or is/are replaced by one or more communication interfaces. Wireless device 14 includes processing circuitry 32.

Processing circuitry 32 includes processor 34 and memory 36. In addition to a traditional processor and memory, processing circuitry 32 may include integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be configured to store code executable by processor 34 and/or other data, e.g., data pertaining to communication, e.g., configuration and/or address data of nodes, etc.

Processing circuitry 32 may be configured to control any of the methods and/or processes described herein and/or to cause such methods, signaling and/or processes to be performed, e.g., by wireless device 14. Processor 34 corresponds to one or more processors 34 for performing wireless device 14 functions described herein. Wireless device 14 includes memory 36 that is configured to store data, programmatic software code and/or other information described herein. In one or more embodiments, memory 36 is configured to store resources code 38. For example, resources code 38 includes instructions that, when executed by processor 34, causes processor 34 to perform the functions described herein such as the functions described with respect to FIGS. 10A and 10B.

Wireless device 14 may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Although embodiments are described herein with reference to certain functions being performed by network node 12 and wireless device 14, it is understood that the functions can be performed in other network nodes and elements. It is also understood that the functions of the network node 12 and wireless device 14 can be distributed across the network cloud, such as the Internet or access network backhaul network, so that other nodes can perform one or more functions or even parts of functions described herein.

Figure 9A:
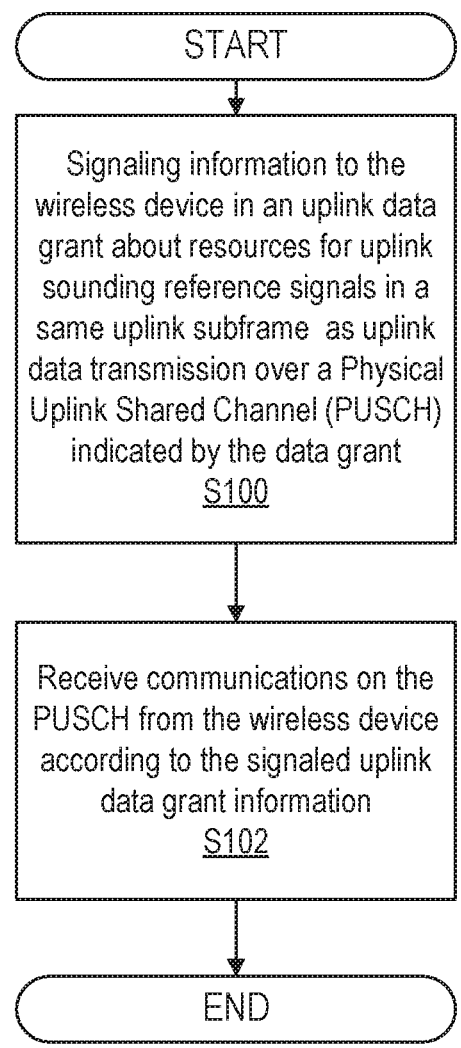
FIGS. 9A and 9B are a flow diagrams of exemplary processes of signaling code 26 in accordance with some of the principles of the disclosure.
Figure 9B:
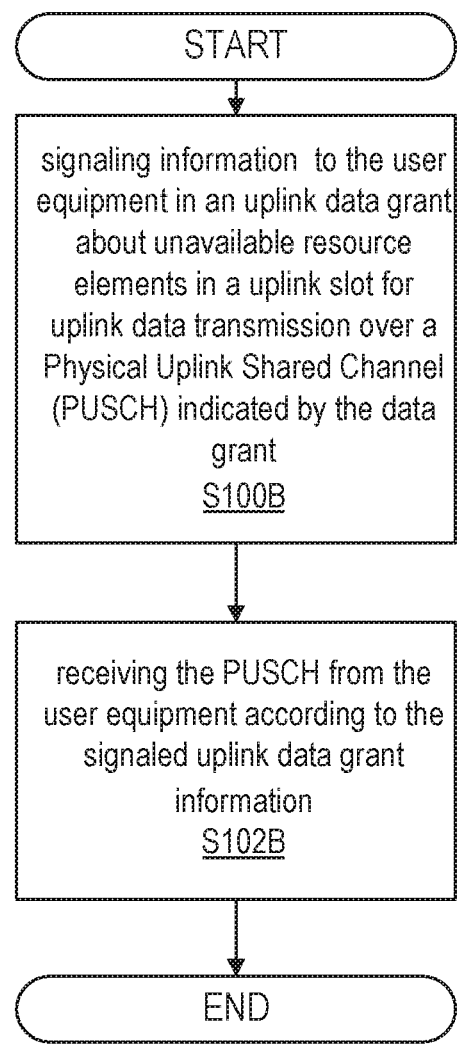

FIGS. 9A and 9B are a flow diagrams of an exemplary processes performed by signaling code 26 in accordance with some of the principles of the disclosure. Processing circuitry 20 is configured to cause signaling of information to wireless device 14 in an uplink data grant about resources for uplink sounding reference signals in a same uplink subframe as uplink data transmission over a Physical Uplink Shared Channel (PUSCH) indicated by the data grant, as described herein such as with respect to one or more of solutions 1-6 (Block S100). Alternatively, processing circuitry 20 is configured to cause signaling information to a user equipment in an uplink data grant about unavailable resources in a uplink slot for uplink data transmission over a Physical Uplink Shared Channel (PUSCH) indicated by the data grant, as described herein such as with respect to one or more of solutions 1-6 (Block S100B). Processing circuitry 20 is configured to receive communications on the PUSCH from wireless device 14 according to the signaled information in the uplink data grant, as described herein such as with respect to one or more of solutions 1-6 (Block S102). Alternatively, processing circuitry 20 is configured to receive the PUSCH from the user equipment according to the signaled uplink data grant information, as described herein such as with respect to one or more of solutions 1-6 (Block S102B). In one or more embodiments, receiver circuitry 18 is configured to receive communications on the PUSCH from wireless device 14 according to the signaled information in uplink data grant, as described herein. Therefore, the disclosure may advantageously dynamically signals SRS resources to wireless device 14 for PUSCH rate matching, as described herein.

Figure 10A:
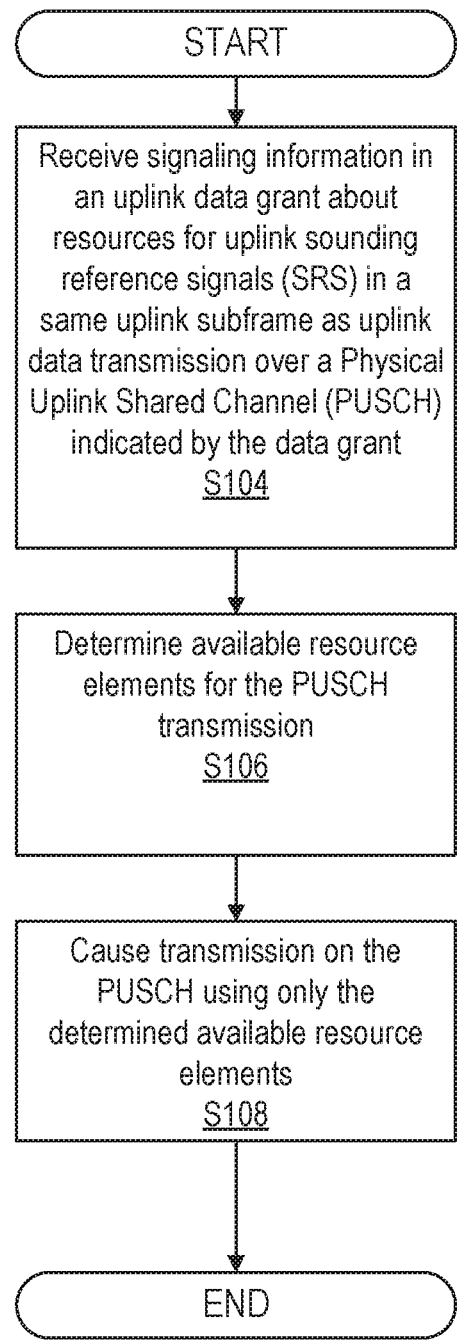
FIGS. 10A and 10B are flow diagrams of an exemplary processes of resources code 38 in accordance with some of the principles of the disclosure.
Figure 10B:
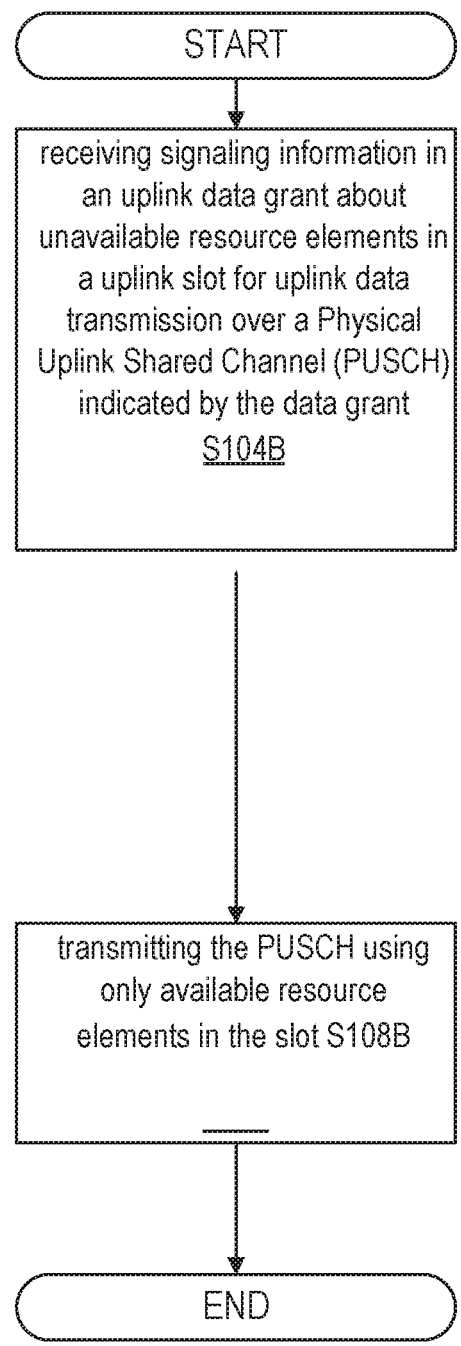

FIGS. 10A and 10 B are flow diagrams of an exemplary processes of resources code 38 in accordance with some of the principles of the disclosure. Processing circuitry 32 is configured to receive signaling information in an uplink data grant about resources for uplink sounding reference signals (SRS) in a same uplink subframe as uplink data transmission over a Physical Uplink Shared Channel (PUSCH) indicated by the data grant, as described herein such as with respect to one or more of solutions 1-6 (Block S104). Alternatively, processing circuitry 32 is configured to receive signaling information in an uplink data grant about unavailable resource elements in a uplink slot for uplink data transmission over a Physical Uplink Shared Channel (PUSCH) indicated by the data grant, as described herein such as with respect to one or more of solutions 1-6 (Block S104B). As shown in FIG. 10A, processing circuitry 32 may be configured to determine available resource elements for the PUSCH transmission, as described herein such as with respect to one or more of solutions 1-6 (Block S106). Processing circuitry 32 is configured to cause transmission on the PUSCH using only the determined available resource elements, as described herein such as with respect to one or more of solutions 1-6 (Block S108). Alternatively, processing circuitry 32 is configured to transmit the PUSCH on only available resource elements in the slot, as described herein such as with respect to one or more of solutions 1-6 (Block S108B). In one or more embodiments, transmitter circuitry 28 is configured to transmit on the PUSCH using only the determined available resource elements, as described herein. Therefore, the disclosure advantageously dynamically signals SRS resources to wireless device 14 for PUSCH rate matching, as described herein.

Solution 1 According to One or More Embodiments: Dynamic Indication of SRS Resources as Zero-Power SRS In this solution, wireless device 14 scheduled with PUSCH transmission in an uplink subframe is also dynamically signaled with an indication of whether one or multiple SRS transmission from other wireless devices 14 also occurring in the same uplink subframe, and if it is, what the SRS resources are. When receiving the indication of SRS presence and the SRS resources, wireless device 14 considers the REs of the SRS resources are reserved and are unavailable for PUSCH transmission in the uplink subframe. Wireless device 14 is then "rate matched" around the SRS resources.

For dynamic signaling, instead of signaling multiple SRS resources, zero-power SRS (ZP SRS) may be defined and signaled to wireless device 14. A ZP SRS is defined as a collection of SRS resources and when signaled to wireless device 14, wireless device 14 should assume zero transmit power in the corresponding PUSCH subframe. In other words, the REs of a ZP SRS resource are reserved and should be muted.

A ZP SRS may be configured as a bitmap with each bit associated with one SRS resource configuration. When a bit is set, wireless device 14 shall assume zero transmission power for the resource elements (REs) associated with the corresponding SRS resource, except for resource elements that overlap with those for which wireless device 14 shall assume non-zero transmission power SRS which is either configured by higher layer (i.e., radio resource control (RRC)) or dynamically signaled.

Wireless device 14 may be configured with multiple ZP SRS semi-statically, each corresponds to a set of SRS resource configurations. One ZP SRS is then dynamically selected from the multiple ZP SRS and signaled to wireless device 14 for PUSCH rate matching.

Figure 11:
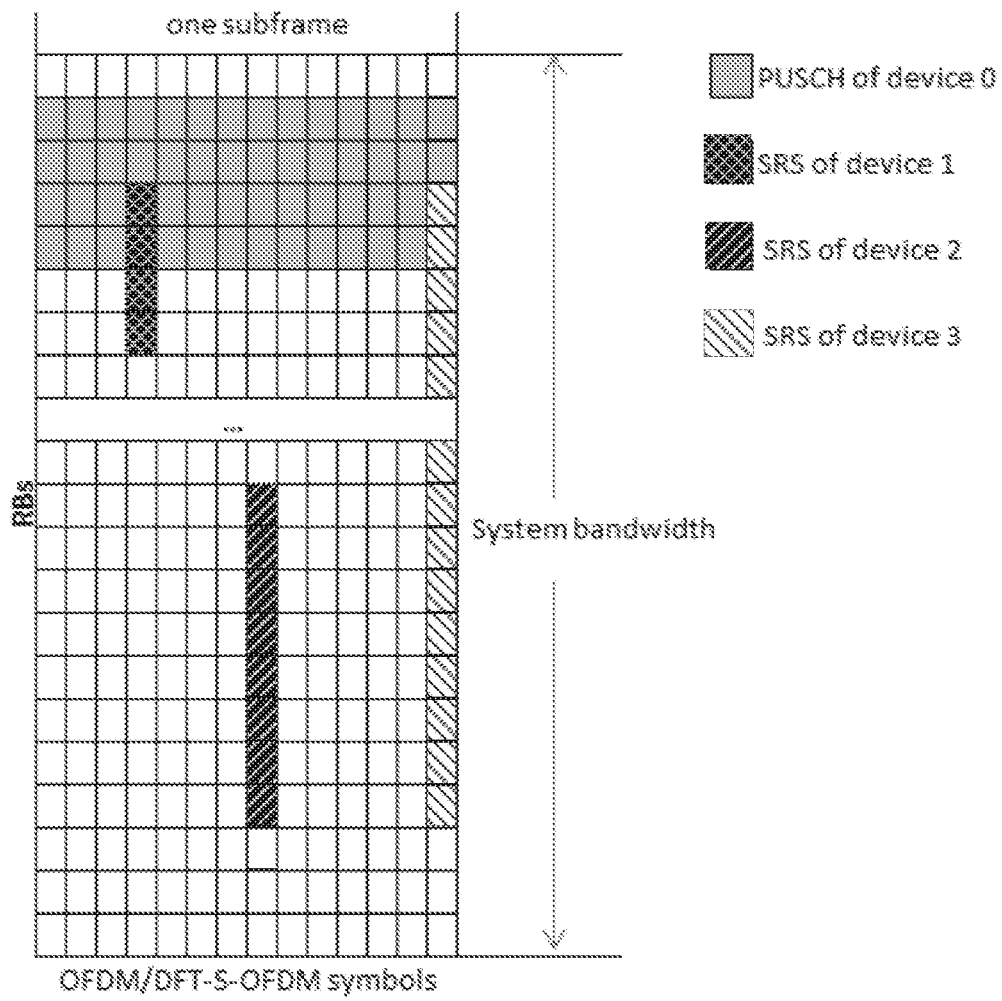
FIG. 11 is a diagram of an example of SRS transmissions in a subframe, where device 0 is scheduled with PUSCH while SRS is scheduled for devices 1 to 3, in accordance with some of the principles of the disclosure.

An example is shown in FIG. 11, where device 0 is scheduled with PUSCH transmission in a subframe while SRS is also scheduled for three other devices (devices 1 to 3) in the same subframe. The SRS resources for the three devices are in different OFDM/DFT-S-OFDM symbols and in different resource blocks. The SRS resources for the three wireless devices can be labelled as {SRS resource 1, SRS resource 2, SRS resource 3}. In this case, a ZP SRS can be defined as an aggregation of the three SRS resources (or a set of resources containing the three resources) and dynamically signaled to device 0.

In general, if there are M possible SRS resource configurations in the system, a length M bitmap $\{b_1, b_2, \ldots b_M\}$ can be defined for ZP SRS. Using the above example, assuming the three SRS resources are the first three of the M SRS resource configurations, a corresponding ZP SRS can be defined as $\{1\ 1\ 1\ 0\ \ldots\ 0\}$. The bitmap can be used to signal the presence of the three SRS resources. In this way, it can signal various combinations of SRS resource configurations.

Figure 12:
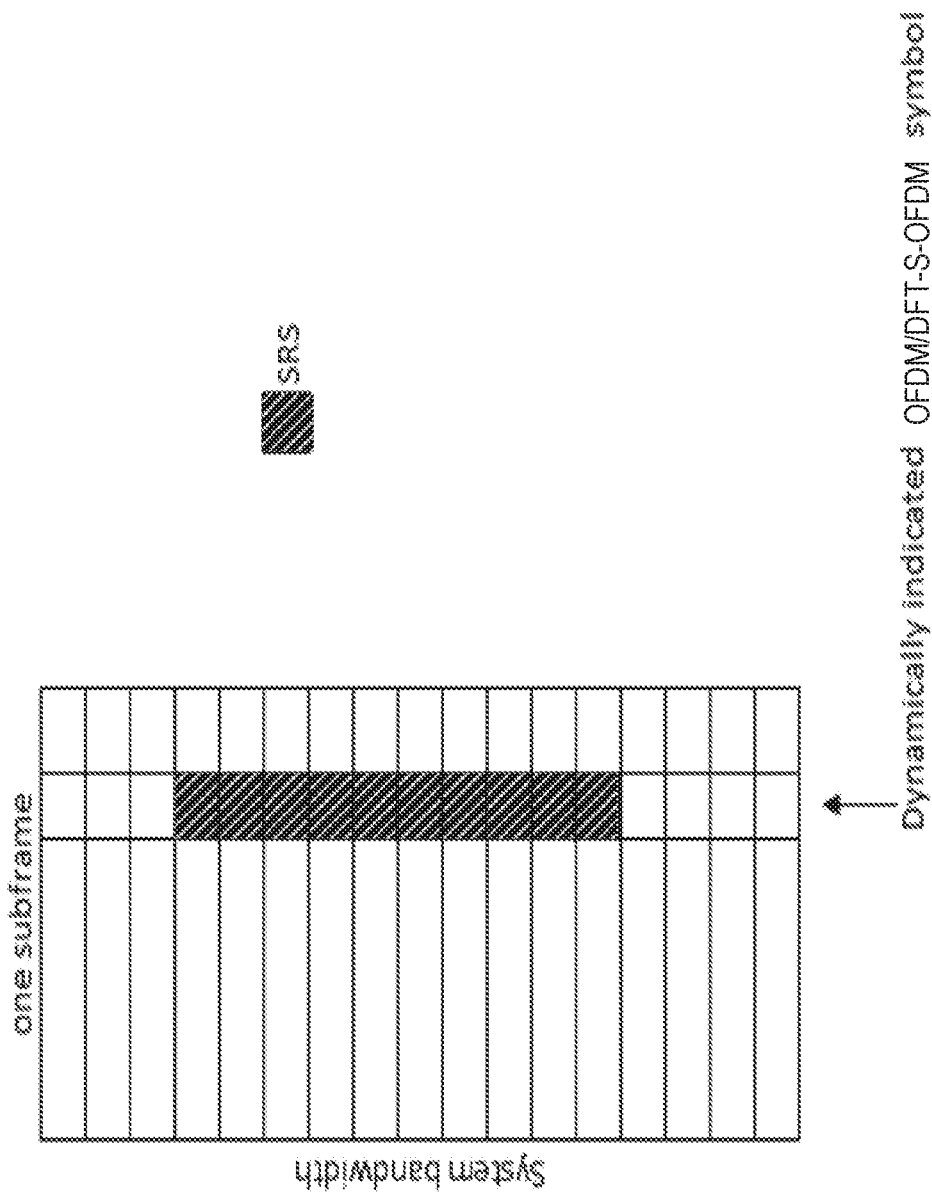
FIG. 12 is a diagram of the dynamic indication of the premises of SRS in a subframe and OFDM/DFT-S-OFDM symbol location in accordance with some of the principles of the disclosure.

Solution 2 According to One or More Embodiments: Dynamic Indication of OFDM or DFT-S-OFDM Symbol Containing SRS In this solution, wireless device 14 with PUSCH scheduled in a subframe is also dynamically signaled with whether a SRS transmission from other wireless devices 14 is also occurring in the same subframe. In case that SRS are transmitted in different OFDM or DFT-S-OFDM symbols in a subframe, the OFDM or DFT-S-OFDM symbols are also dynamically signaled. FIG. 12 is a block diagram of the dynamic indication of the presence of SRS in a subframe and OFDM/DFT-S-OFDM symbol location in accordance with the principles of the disclosure. When wireless device 14 is indicated that a SRS is also transmitted in an OFDM/DFT-S-OFDM symbol in the same subframe, wireless device 14 removes the whole OFDM or DFT-S-OFDM symbol with SRS from the calculation of available PUSCH REs, i.e. the PUSCH is not transmitted in any resource element in the OFDM or DFT-S-OFDM symbol.

Figure 13:
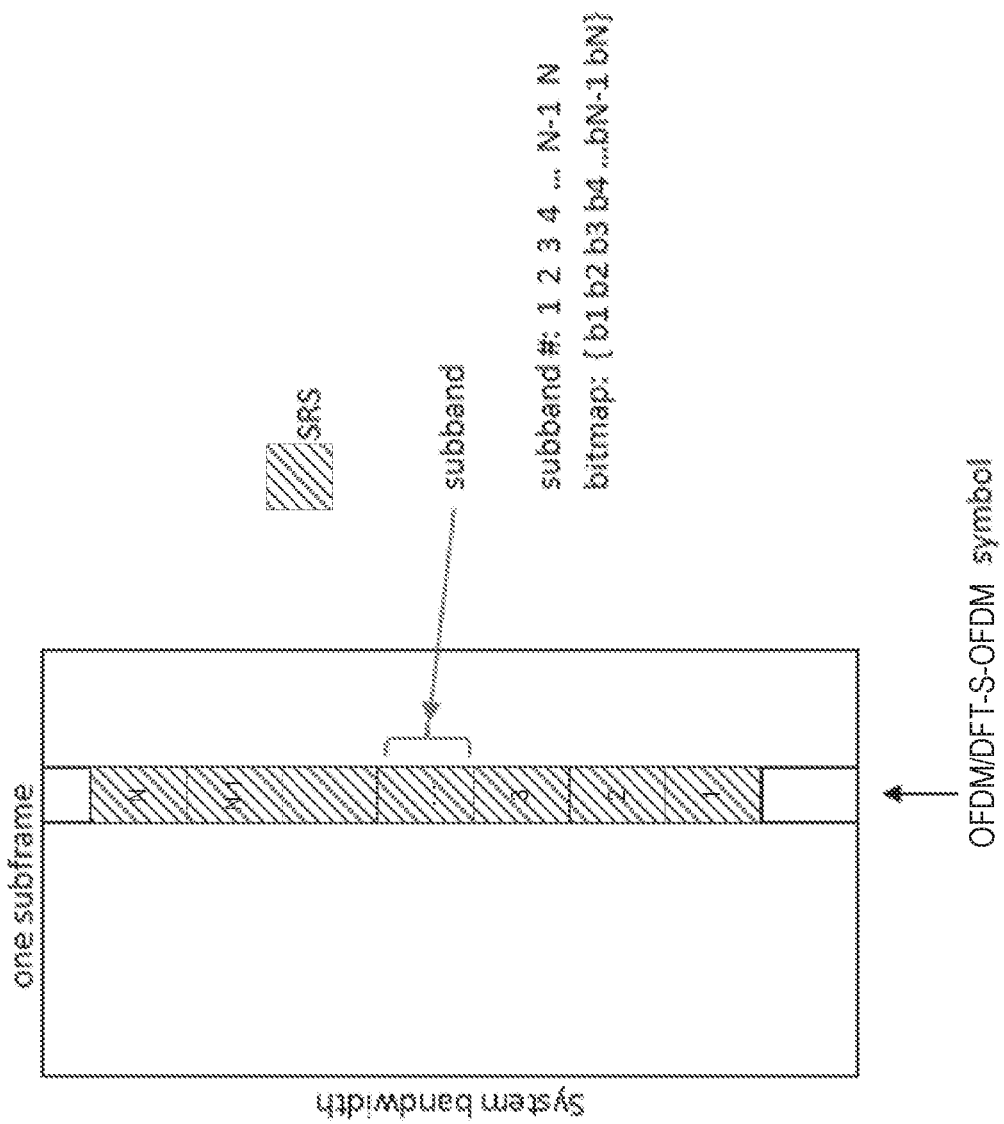
FIG. 13 is a diagram of a dynamic indication of the presence of SRS with a subband based bitmap in accordance with some of the principles of the disclosure.

Solution 3 According to One or More Embodiments: Dynamic Indication of OFDM or DFT-S-OFDM Symbol Containing SRS and SRS Subband Locations A potential drawback of the previous solution is that if the SRS does not overlap with the PUSCH, the REs in OFDM or DFT-S-OFDM symbol containing SRS may be wasted. To improve resource utilization efficiency, the bandwidth of the SRS can also be dynamically signaled. In one or more embodiments, a bitmap is used to cover the whole system bandwidth with each bit associated with one SRS subband. A bit of one may indicate a SRS transmission in the corresponding subband and a bit of zero may indicate otherwise. The bitmap can be dynamically signalled to wireless devices 14 scheduled with PUSCH for PUSCH rate matching around SRS. An example of the indication using the bitmap is shown in FIG. 13. In particular, FIG. 13 is a block diagram of a dynamic indication of the presence of SRS with a subband based bitmap in accordance with the principles of the disclosure.

Figure 14:
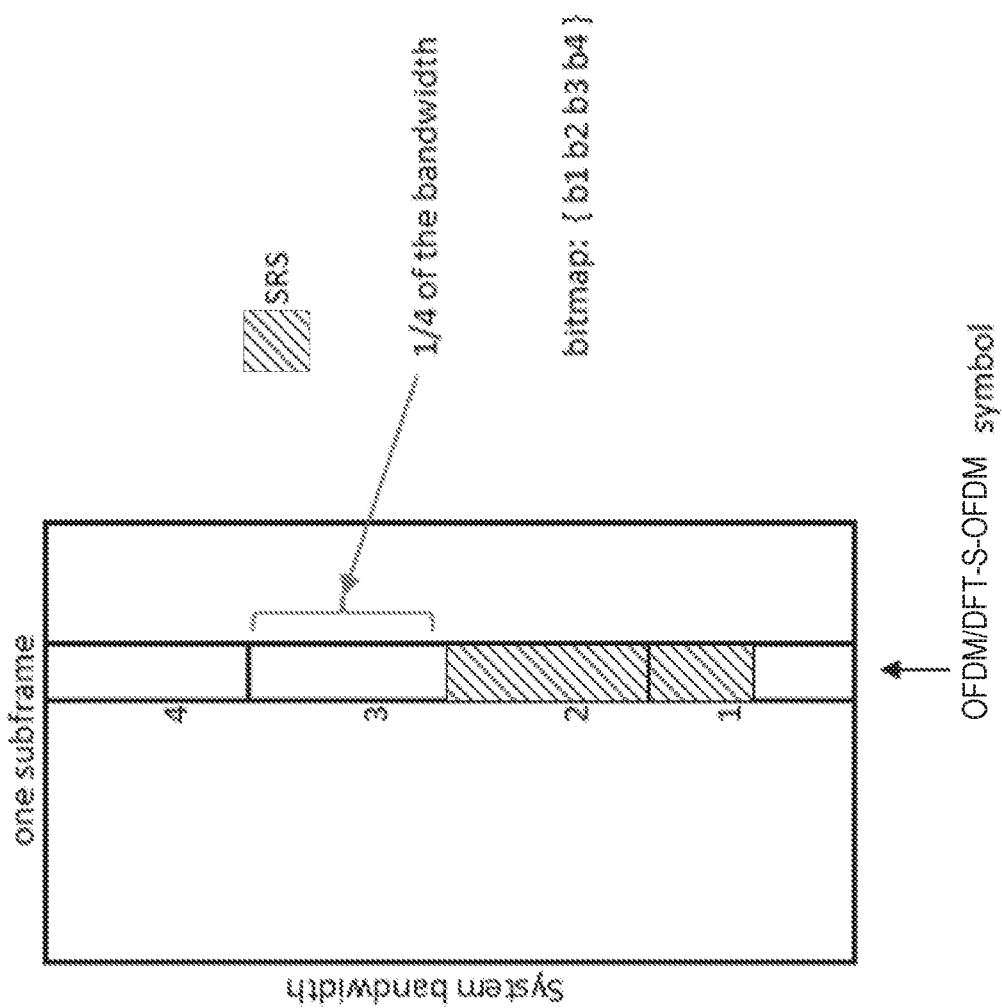
FIG. 14 is a diagram of an example of using a 4-bit bitmap to dynamically signal the presence of SRS in a subframe in accordance with the principles of the disclosure.

Solution 4 According to One or More Embodiments: Dynamic Indication of OFDM or SC-OFDM Symbol Containing SRS with a Configurable Size Bitmap When the number of subbands is large, the per subband based bitmap may lead to large DCI overhead. In one or more embodiments, some coarse bitmap may be used for SRS indication. Each bit may be mapped to multiple subbands. In one example, a bitmap with two bits, i.e., {b1, b2}, may be used to indicate which half of the system bandwidth a SRS is present. In another example, a bitmap with four bits, i.e., {b1, b2, b3, b4}, may be used to indicate which quarter of the system bandwidth a SRS is present. The bitmap size can also be semi-statically configured. An example is shown in FIG. 14, in which the system bandwidth is divided into four subbands and one bit is mapped to one subband. In this case the subband may not be the same as SRS subband. In this example, the signalled bitmap would be {1 1 0 0}. FIG. 14 is a diagram of an example of using a 4-bit bitmap to dynamically signal the presence of SRS in a subframe in accordance with the principles of the disclosure.

Figure 15:
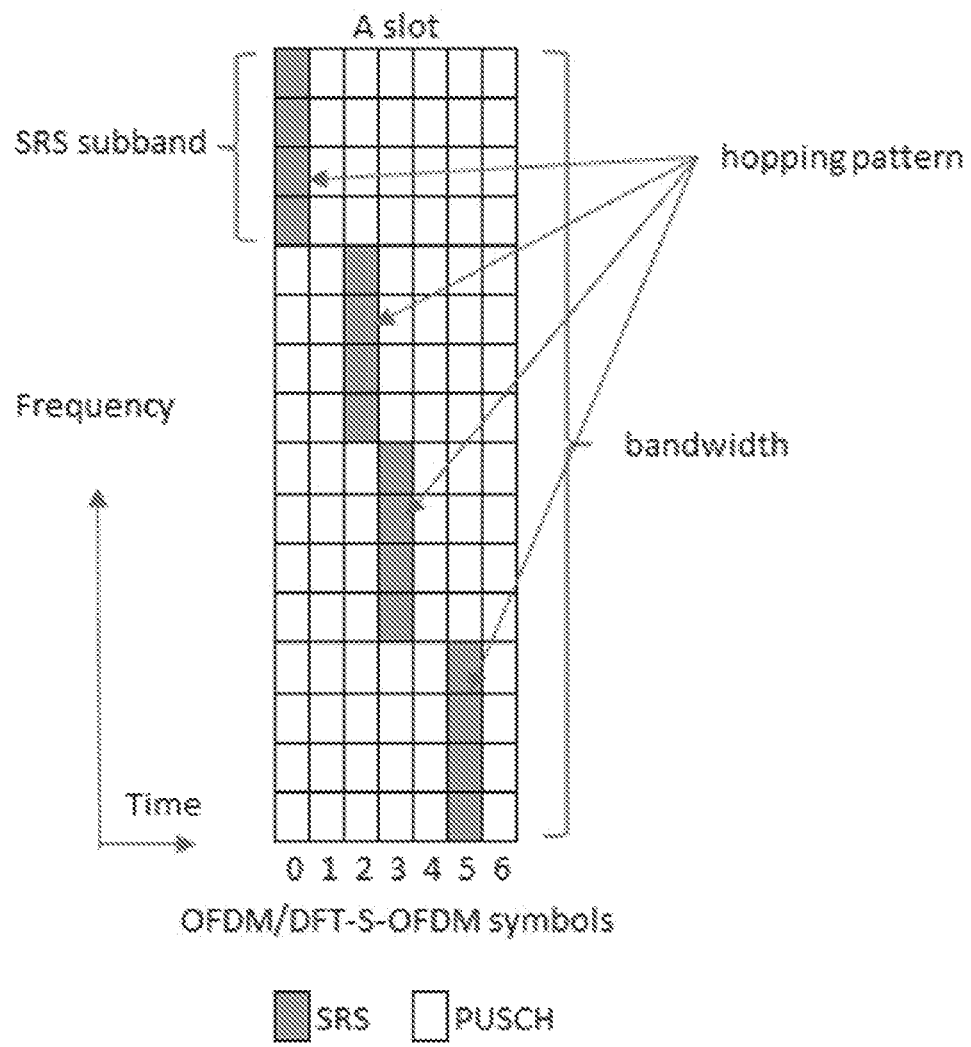
FIG. 15 is a is a diagram of an example of SRS frequency hopping in a slot, in accordance with some of the principles of the disclosure.

Solution 5 According to One or More Embodiments: Dynamically Signaling a SRS Subband and a Frequency Hopping Pattern In NR, frequency hopping may be configured for SRS so that different parts of the system bandwidth may be sounded over multiple OFDM/DFT-S-OFDM symbols in a slot or subframe as shown in FIG. 15, where SRS is transmitted in different subbands in different OFDM/DFT-S-OFDM symbols.

In one embodiment, SRS may be transmitted in all OFDM symbols in a slot. In this case, the SRS hopping pattern (i.e. the sequence of subbands hopped over a slot) may be either semi-statically configured or dynamically signaled to a wireless device with PUSCH transmission scheduled in the same uplink subframe, so that the wireless device assumes the REs overlapped with the SRS REs are not available for PUSCH transmission.

The wireless device may be configured by higher layers with multiple SRS frequency hopping patterns and a bit field in the DCI used for PUSCH scheduling may be used to indicate which SRS hopping pattern out of the set of hopping patterns is configured in the uplink subframe or slot.

In some cases, the signaled hopping pattern may not be exactly the same as the actual hopping patterns used in a slot or subframe, but rather a super set of the actual hopping patterns. For example, if there are four hopping patterns {A, B, C, D} are configured, two bits are required to signal any one hopping pattern. Alternatively, one bit may be used to signal either hopping patterns {A, B} or {C, D}. This saves 1 bit signaling overhead in the DCI at the cost of additional REs being excluded from PUSCH transmission. For instance, if pattern A is the actual pattern used, then {A, B} would be signaled to the wireless device and the REs associated with Pattern B would also be excluded from PUSCH transmission.

In another embodiment, only a subset of OFDM/DFT-S-OFDM symbols in a slot or subframe may be configured for SRS. For example, OFDM symbols {0, 2, 3, 5} in the example in FIG. 15. In this case, a bitmap indicating the OFDM/DFT-S_OFDM symbols containing SRS may also be signaled together with the SRS hopping pattern. A length 7 bitmap {1011010} may be used for the example in FIG. 15. A symbol containing SRS is indicated by set the corresponding bit in the bitmap to one.

Solution 6 According to One or More Embodiments: PUSCH Rate Matching when SRS from the Same Wireless Device is Also Configured in the Same Subframe When both PUSCH and SRS from the same wireless device 14 are to be transmitted in the same subframe, for DFT-S-OFDM configured in the uplink subframe, the whole DFT-S-OFDM symbol or symbols containing the SRS is considered unavailable for PUSCH transmission to maintain low peak to average power ratio (PAPR).

Figure 16:
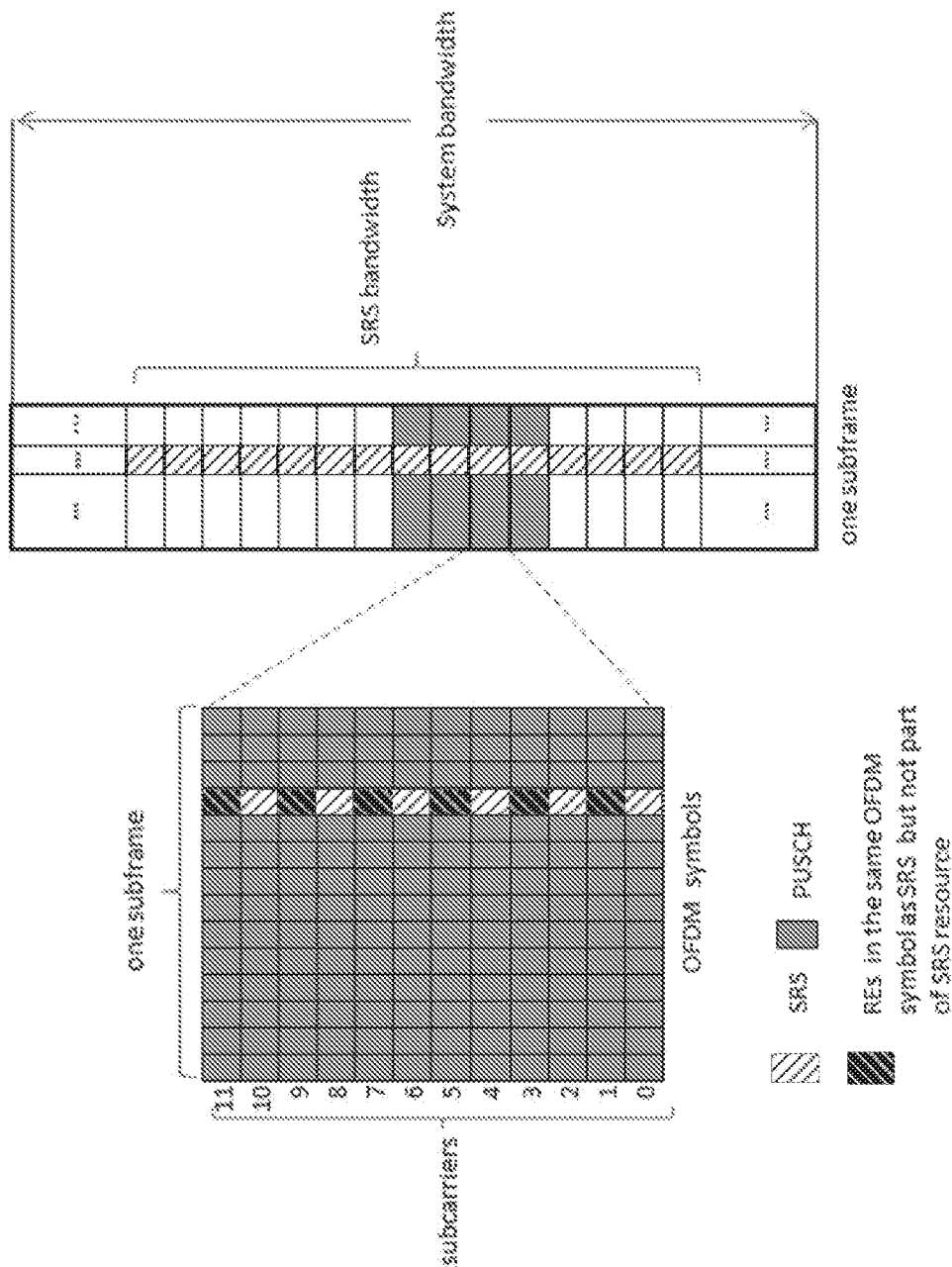
FIG. 16 is a diagram of an example of REs in the same OFDM symbol as SRS but on different subcarriers in accordance with some of the principles of the disclosure.

If plain OFDM (i.e. CP-OFDM) is configured in an uplink subframe and wireless device 14 is configured to transmit both PUSCH and SRS in the subframe, for REs in OFDM symbols containing SRS but are not part of the SRS resource, the REs should be considered available for PUSCH transmission. An example is shown in FIG. 16, where the REs in the same OFDM symbol as SRS but on different subcarriers can be used for PUSCH. FIG. 16 is a diagram of an example of REs in the same OFDM symbol as SRS but on different subcarriers in accordance with the principles of the disclosure.

Figure 18:
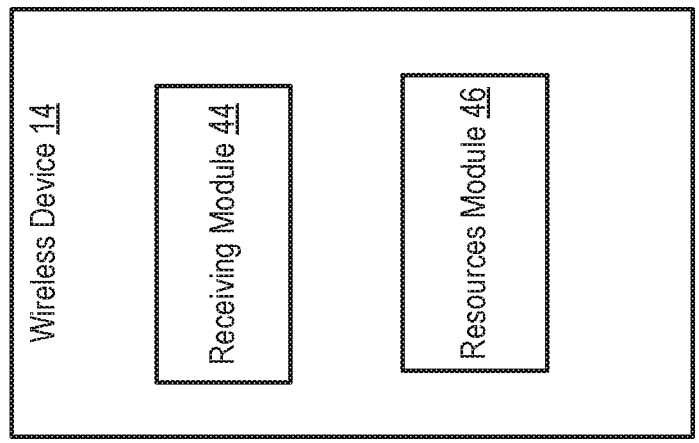
FIG. 18 is a block diagram of an alternative embodiment of wireless device 14 in accordance with some of the principles of the disclosure.
Figure 17:
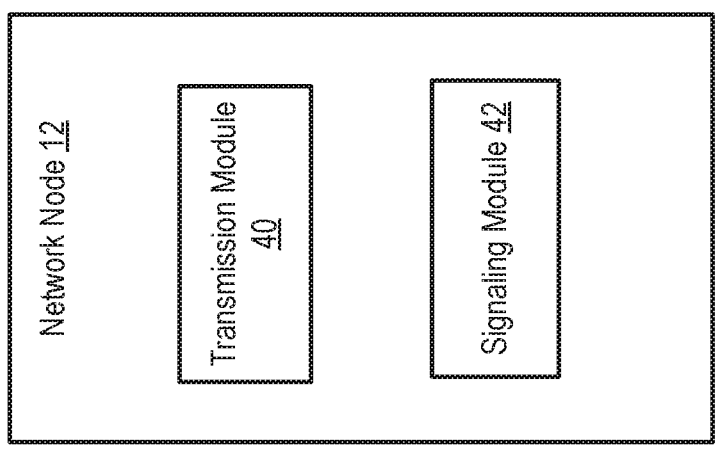
FIG. 17 is a block diagram of an alternative embodiment of network node 12 in accordance with some of the principles of the disclosure.

FIG. 17 is a block diagram of an alternative embodiment of network node 12 in accordance with the principles of the disclosure. Network node 12 includes transmission module 40 for performing receiving functions described herein such as with respect to transmitter circuitry 16. Network node 12 includes signaling module 42 for performing the functions described herein such as with respect to signaling code 26. FIG. 18 is a block diagram of an alternative embodiment of wireless device 14 in accordance with the principles of the disclosure. Wireless device 14 includes receiving module 44 for performing the receiving functions described herein such as with respect to receiver circuitry 30. Wireless device 14 includes resources module 46 for performing functions described herein such as with respect to resources code 38.

Some Example Embodiments include:

Example Embodiment 1A

Method of synchronizing uplink time frequency resources used for uplink data transmission between a network node and a wireless device in a wireless network, including: dynamically signaling information to the wireless device in an uplink data grant about resources for uplink sounding reference signals in a same uplink subframe as uplink data transmission over a Physical Uplink Shared Channel (PUSCH) indicated by the data grant; determining available resource elements for the PUSCH transmission; and transmitting the PUSCH on only the available resource elements.

Example Embodiment 2A

The method of Example Embodiment 1A, wherein the information about SRS resources comprises a bitmap with each bit associated with one SRS resource configuration and when a bit is set to one, the wireless device shall assume zero transmission power for the resource elements corresponding to the associated SRS resource configuration.

Example Embodiment 3A

The method of Example Embodiment 1A, wherein the information about SRS resources comprises an indication of OFDM symbol(s) configured with SRS.

Example Embodiment 4A

The method of Example Embodiment 1A, wherein the information about SRS resources comprises a bitmap with each bit associated with a SRS subband and when a bit is set to one, the wireless device shall assume zero transmission power in the associated SRS subband in an OFDM symbol(s) preconfigured.

Example Embodiment 5A

The method of Example Embodiment 4A, wherein the size of the bitmap is configurable by higher layers, i.e., radio resource control (RRC) signaling.

Example Embodiment 6A

The method of Example Embodiment 1A, wherein the determining comprises assuming zero transmit power on REs in OFDM symbols containing any SRS resource.

Example Embodiment 7A

The method of Example Embodiment 1A, wherein the determining comprises assuming zero transmit power on only REs which are included the SRS resources.

Example Embodiment 8A

The method of Example Embodiment 1A, wherein the SRS resources are for other wireless devices served by the same network node.

Example Embodiment 9A

The method of Example Embodiment 1A, wherein the information about SRS resources comprises an indication of a SRS hopping pattern;

Example Embodiment 10A

The method of Example Embodiment 1A, wherein the information about SRS resources comprises an indication of a SRS hopping pattern and a bitmap indicating OFDM symbols containing SRS;

Embodiment 1

A wireless device for uplink data transmission to a network node, the wireless device comprising: receiving circuitry configured to receive signaling information in an uplink data grant about resources for uplink sounding reference signals (SRS) in a same uplink subframe as uplink data transmission over a Physical Uplink Shared Channel (PUSCH) indicated by the data grant, and processing circuitry configured to: determine available resource elements for the PUSCH transmission; and cause transmission on the PUSCH using only the determined available resource elements.

Embodiment 2

The wireless device of Embodiment 1, wherein the information about the resources includes a bitmap with each bit associated with one SRS resource configuration and the processing circuitry further configured to, if a bit in the bitmap is set to one, determine the resource elements corresponding to the associated SRS resource configuration are zero transmission power.

Embodiment 3

The wireless device of any one of Embodiments 1-2, wherein the information about the resources includes an indication of at least one Orthogonal Frequency Division Multiplexing (OFDM) symbol configured with SRS.

Embodiment 4

The wireless device of any one of Embodiments 1-3, wherein the information about SRS resources includes a bitmap with each bit associated with a SRS subband; and the processing circuitry further configured to, if a bit in the bitmap is set to one, determine zero transmission power in the associated SRS subband in at least one OFDM symbol is preconfigured.

Embodiment 5

The wireless device of any one of Embodiments 1-4, wherein the size of the bitmap is configurable by signaling on an OSI layer equal to or greater than layer 3.

Embodiment 6

The wireless device of Embodiment 5, wherein the signaling is radio resource control (RRC) signaling.

Embodiment 7

The wireless device of any one of Embodiments 1-2, wherein the information about the resources includes an indication of a SRS hopping pattern.

Embodiment 8

The wireless device of any one of Embodiments 1-2, wherein the information about the resources includes an indication of at least one of a SRS hopping pattern and a bitmap indicating OFDM symbols containing SRS.

Embodiment 7

The wireless device of Embodiment 1, wherein the processing circuitry further configured to determine zero transmit power on resource elements (REs) in OFDM symbols contain any SRS resource.

Embodiment 9

The wireless device of Embodiment 1, wherein the processing circuitry further configured to determine zero transmit power on only resource elements (REs) which are included in the resources.

Embodiment 10

The wireless device of Embodiment 1, wherein the resources are for other wireless devices served by the same network node.

Embodiment 11

A method for a wireless device for uplink data transmission to a network node, the method comprising: receiving signaling information in an uplink data grant information about resources for uplink sounding reference signals (SRS) in a same uplink subframe as uplink data transmission over a Physical Uplink Shared Channel (PUSCH) indicated by the data grant; determining available resource elements for the PUSCH transmission, and causing transmission on the PUSCH using only the determined available resource elements.

Embodiment 12

The method of Embodiment 11, wherein the information about the resources includes a bitmap with each bit associated with one SRS resource configuration, the method further comprising, if a bit in the bitmap is set to one, determining the resource elements corresponding to the associated SRS resource configuration are zero transmission power.

Embodiment 13

The method of any one of Embodiments 11-12, wherein the information about the resources includes an indication of at least one Orthogonal Frequency Division Multiplexing (OFDM) symbol configured with SRS.

Embodiment 14

The method of any one of Embodiments 11-13, wherein the information about SRS resources includes a bitmap with each bit associated with a SRS subband; the method further comprising, if a bit in the bitmap is set to one, determining zero transmission power in the associated SRS subband in at least one OFDM symbol is preconfigured.

Embodiment 15

The method of any one of Embodiments 11-14, wherein the size of the bitmap is configurable by signaling on an OSI layer equal to or greater than layer 3.

Embodiment 16

The method of Embodiment 15, wherein the signaling is radio resource control (RRC) signaling.

Embodiment 17

The method of any one of Embodiments 11-12, wherein the information about the resources includes an indication of a SRS hopping pattern.

Embodiment 18

The method of any one of Embodiments 11-12, wherein the information about the resources includes an indication of a SRS hopping pattern and a bitmap indicating OFDM symbols containing SRS.

Embodiment 19

The method of Embodiment 11, wherein the determining includes determining zero transmit power on resource elements (REs) in OFDM symbols contain any SRS resource.

Embodiment 20

The method of Embodiment 11, wherein the determining includes determining zero transmit power on only resource elements (REs) which are included in the resources.

Embodiment 21

The method of Embodiment 11, wherein the resources are for other wireless devices served by the same network node.

Embodiment 22

A network node for synchronizing uplink time frequency resources used for uplink data transmission in a wireless network, the network node comprising: processing circuitry configured to signal information to the wireless device in an uplink data grant about resources for uplink sounding reference signals in a same uplink subframe as uplink data transmission over a Physical Uplink Shared Channel (PUSCH) indicated by the data grant, and receiver circuitry configured to receive communications on the PUSCH from the wireless device according to the signaled uplink data grant information.

Embodiment 23

The network node of Embodiment 22, wherein the information about the resources includes a bitmap with each bit associated with one SRS resource configuration; and a bit in the bitmap set to one indicating that the resource elements correspond to the associated SRS resource configuration are zero transmission power.

Embodiment 24

The network node of any one of Embodiments 22-23, wherein the information about the resources includes an indication of at least one OFDM symbol configured with SRS.

Embodiment 25

The network node of Embodiment 22, wherein the information about SRS resources includes a bitmap with each bit associated with a SRS subband; a bit in the bitmap set to one indicating a zero transmission power in the associated SRS subband in at least one OFDM symbol is preconfigured.

Embodiment 26

The network node of any one of Embodiments 22-25, wherein the size of the bitmap is configurable by signaling on an OSI layer equal to or greater than layer 3.

Embodiment 27

The network node of Embodiment 26, wherein the signaling is radio resource control (RRC) signaling.

Embodiment 28

The network node of any one of Embodiments 22-23, wherein the information about the resources includes an indication of a SRS hopping pattern.

Embodiment 29

The network node of any one of Embodiments 22-23, wherein the information about the resources includes an indication of at least one of a SRS hopping pattern and a bitmap indicating OFDM symbols containing SRS.

Embodiment 30

The network node of Embodiment 22, wherein the resources are for other wireless devices served by the network node.

Embodiment 31

A method for network node for synchronizing uplink time frequency resources used for uplink data transmission in a wireless network, the method comprising: signaling information to the wireless device in an uplink data grant about resources for uplink sounding reference signals in a same uplink subframe as uplink data transmission over a Physical Uplink Shared Channel (PUSCH) indicated by the data grant, and receiving communications on the PUSCH from the wireless device according to the signaled uplink data grant information.

Embodiment 32

The method of Embodiment 31, wherein the information about the resources includes a bitmap with each bit associated with one SRS resource configuration; and a bit in the bitmap set to one indicating that the resource elements correspond to the associated SRS resource configuration are zero transmission power.

Embodiment 33

The method of any one of Embodiments 31-32, wherein the information about the resources includes an indication of at least one OFDM symbol configured with SRS.

Embodiment 34

The method of Embodiment 31, wherein the information about SRS resources includes a bitmap with each bit associated with a SRS subband; and a bit in the bitmap set to one indicating a zero transmission power in the associated SRS subband in at least one OFDM symbol is preconfigured.

Embodiment 35

The method of any one of Embodiments 31-34, wherein the size of the bitmap is configurable by signaling on an OSI layer equal to or greater than layer 3.

Embodiment 36

The method of Embodiment 35, wherein the signaling is radio resource control (RRC) signaling.

Embodiment 37

The method of any one of Embodiments 31-32, wherein the information about the resources includes an indication of a SRS hopping pattern.

Embodiment 38

The method of any one of Embodiments 31-32, wherein the information about the resources includes an indication of a SRS hopping pattern and a bitmap indicating OFDM symbols containing SRS.

Embodiment 39

The method of Embodiment 31, wherein the resources are for other wireless devices served by the network node.

Embodiment 40

A wireless device for uplink data transmission to a network node, wireless device comprising: a receiving module configured to receive signaling information in an uplink data grant about resources for uplink sounding reference signals (SRS) in a same uplink subframe as uplink data transmission over a Physical Uplink Shared Channel (PUSCH) indicated by the data grant, a resources module configured to: determine available resource elements for the PUSCH transmission, and cause transmission on the PUSCH using only the determined available resource elements.

Embodiment 41

A network node for synchronizing uplink time frequency resources used for uplink data transmission in a wireless network, the network node comprising a signaling module configured to signaling information to the wireless device in an uplink data grant about resources for uplink sounding reference signals in a same uplink subframe as uplink data transmission over a Physical Uplink Shared Channel (PUSCH) indicated by the data grant, and a receiving module configured to receive communications on the PUSCH from the wireless device according to the signaled uplink data grant information.

According to one aspect, in some embodiments, a user equipment for uplink data transmission to a base station is provided. The user equipment includes receiving circuitry configured to receive signaling information in an uplink data grant about unavailable resource elements in a uplink subframe for uplink data transmission over a Physical Uplink Shared Channel (PUSCH) indicated by the data grant and processing circuitry configured to transmit the PUSCH on only available resource elements in the subframe. In some embodiments, the information about the unavailable resource elements includes a bitmap with each bit associated with one SRS resource configuration. In some embodiments, the information about the unavailable resource elements includes an indication of at least one Orthogonal Frequency Division Multiplexing (OFDM) symbol. In some embodiments, the information about the unavailable resource elements includes at least one of a bitmap with each bit associated with a SRS subband and a bitmap indicating OFDM symbols. In some embodiments, the size of the bitmap is configurable by a Radio Resource Control signaling. In some embodiments, the information about the unavailable resource elements includes an indication of a SRS hopping an indication of at least one of a SRS hopping pattern and a bitmap indicating OFDM symbols containing SRS. In some embodiments, the processing circuitry is further configured to determine available resource elements (REs) for the PUSCH in OFDM symbols containing any SRS resource. In some embodiments, the indicated resources for uplink sounding reference signals (SRS) are for at least one other user equipment and the processing circuitry is further configured to treat the SRS resources as zero transmit power resources.

According to another aspect, in some embodiments, a method for a user equipment for uplink data transmission to a base station is provided. The method includes receiving signaling information in an uplink data grant about unavailable resource elements in a uplink subframe for uplink data transmission over a Physical Uplink Shared Channel (PUSCH) indicated by the data grant and transmitting the PUSCH using only available resource elements in the subframe. In some embodiments, the resource elements are for sounding reference signals (SRS). In some embodiments, the resource elements are for sounding reference signals (SRS transmissions from at least a second user equipment in the uplink slot. In some embodiments, the information about the unavailable resource elements includes a bitmap with each bit associated with one SRS resource configuration. In some embodiments, information about the unavailable resource elements includes an indication of at least one Orthogonal Frequency Division Multiplexing (OFDM) symbol configured with SRS. In some embodiments, the information about unavailable resource elements includes at least one of a bitmap with each bit associated with a SRS subband and a bitmap indicating ate least one OFDM symbol. In some embodiments, the size of the bitmap is configurable by radio resource control (RRC) signaling. In some embodiments, the information about the unavailable resource elements includes an indication of a SRS hopping pattern. In some embodiments, the information about the unavailable resource elements includes an indication of at least one of a SRS hopping pattern and a bitmap indicating OFDM symbols containing SRS. In some embodiments, the method further includes determining available resource elements (REs) in OFDM symbols containing any SRS resource. In some embodiments, the SRS resources are for at least one other user equipment served by the same base station and are zero transmit power resources.

According to another aspect, in some embodiments, a base station for receiving uplink data transmission in a wireless network is provided. The base station includes processing circuitry configured to signal information to a user equipment in an uplink data grant about unavailable resources in a uplink subframe for uplink data transmission over a Physical Uplink Shared Channel (PUSCH) indicated by the data grant and receiver circuitry configured to receive the PUSCH from the user equipment according to the signaled uplink data grant information.

In some embodiments, the information about the unavailable resource elements includes a bitmap with each bit associated with one SRS resource configuration. In some embodiments, the information about the unavailable resource elements includes an indication of at least one OFDM symbol configured with SRS. In some embodiments, the information about the unavailable resource elements includes a bitmap with each bit associated with a SRS subband, and/or an indication of a zero transmission power in the associated SRS subband in at least one OFDM symbol. In some embodiments, the size of the bitmap is configurable by radio resource control (RRC) signaling. In some embodiments, the information about the unavailable resource elements includes an indication of a SRS hopping pattern. In some embodiments, the information about the unavailable resource elements includes an indication of at least one of a SRS hopping pattern and a bitmap indicating OFDM symbols containing SRS. In some embodiments, the SRS resources are for at least one other user equipment served by the base station.

According to another aspect, in some embodiments, a method for base station for receiving uplink data transmission in a wireless network is provided. The method includes signaling information to the user equipment in an uplink data grant about unavailable resource elements in a uplink subframe for uplink data transmission over a Physical Uplink Shared Channel (PUSCH) indicated by the data grant receiving the PUSCH from the user equipment according to the signaled uplink data grant information. In some embodiments, the information about the unavailable resource elements includes a bitmap with each bit associated with one SRS resource configuration. In some embodiments, the information about the unavailable resource elements includes an indication of at least one OFDM symbol configured with SRS. In some embodiments, the information about the unavailable resource elements includes a bitmap with each bit associated with a SRS subband; and/or an indication of configuration of a zero transmission power in the associated SRS subband in at least one OFDM symbol. In some embodiments, the size of the bitmap is configurable by radio resource control (RRC). In some embodiments, the information about the unavailable resource elements includes an indication of a SRS hopping pattern. In some embodiments, the information about the unavailable resource elements includes an indication of at least one of a SRS hopping pattern and a bitmap indicating OFDM symbols containing SRS. In some embodiments, the unavailable resource elements are SRS resources for at least one other user equipment served by the base station.

According to another aspect, in some embodiments, a user equipment for uplink data transmission to a base station is provided. The user equipment includes a receiving module configured to receive signaling information in an uplink data grant about unavailable resource elements in a uplink subframe for uplink data transmission over a Physical Uplink Shared Channel (PUSCH) indicated by the data grant and a resources module configured to transmit the PUSCH using only available resource elements.

According to another aspect, in some embodiments, a base station for receiving uplink data transmission in a wireless network is provided. The base station includes signaling module configured to signaling information to the user equipment in an uplink data grant about unavailable resource elements in a uplink subframe for uplink data transmission over a Physical Uplink Shared Channel (PUSCH) indicated by the data grant and receiving module configured to receive the PUSCH from the user equipment according to the signaled uplink data grant information.

Therefore, the disclosure advantageously provides dynamic signaling of SRS resources for PUSCH rate matching. A benefit of some embodiments may be that PUSCH rate matching can be done dynamically when dynamic SRS transmission.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments are disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A user equipment for uplink data transmission to a base station, the user equipment comprising:
   receiving circuitry configured to receive information in an uplink data grant about unavailable resource elements in an uplink slot for uplink data transmission over a Physical Uplink Shared Channel (PUSCH) indicated by the uplink data grant, the received information about the unavailable resource elements including:
      at least an indication of at least one Orthogonal Frequency Division Multiplexing (OFDM) symbol;
      at least one bit being associated with an SRS subband; and
      an indication of a zero transmission power in the SRS subband in the at least one OFDM symbol; and
   processing circuitry configured to:
      transmit the PUSCH on only available resource elements in the uplink slot.

2. The user equipment of claim 1, wherein the information about the unavailable resource elements includes a bitmap with each bit associated with one SRS resource configuration.

3. The user equipment of claim 1, wherein the at least one bit is part of at least one of a bitmap with each bit associated with the SRS subband and a bitmap indicating OFDM symbols.

4. The user equipment of claim 1, wherein the size of a bitmap is configurable by a Radio Resource Control signaling.

5. The user equipment of claim 1, wherein the data transmission is in an NR wireless network.

6. The user equipment of claim 1, wherein the information about the unavailable resource elements includes an indication of a SRS hopping pattern.

7. The user equipment of claim 1, wherein the information about the unavailable resource elements includes an indication of at least one of a SRS hopping pattern and a bitmap indicating OFDM symbols containing SRS.

8. The user equipment of claim 1, wherein the processing circuitry is further configured to determine available resource elements (REs) for the PUSCH in OFDM symbols containing any SRS resource.

9. The user equipment of claim 1, wherein the indicated resources for uplink sounding reference signals (SRS) are for at least one other user equipment and the processing circuitry is further configured to treat the SRS resources as zero transmit power resources.

10. A method for a user equipment for uplink data transmission to a base station, the method comprising:
    receiving information in an uplink data grant about unavailable resource elements in an uplink slot for uplink data transmission over a Physical Uplink Shared Channel (PUSCH) indicated by the uplink data grant, the received information about the unavailable resource elements including:
       at least an indication of at least one Orthogonal Frequency Division Multiplexing (OFDM) symbol;
       at least one bit being associated with an SRS subband; and
       an indication of a zero transmission power in the SRS subband in the at least one OFDM symbol; and
    transmitting the PUSCH using only available resource elements in the uplink slot.

11. The method of claim 10, wherein the information about the unavailable resource elements includes a bitmap with each bit associated with one SRS resource configuration.

12. The method of claim 10, wherein the indication of at least one Orthogonal Frequency Division Multiplexing (OFDM) symbol is configured with SRS.

13. A base station for receiving uplink data transmission in a wireless network, the base station comprising:
    processing circuitry configured to signal information to a user equipment in an uplink data grant about unavailable resource elements in an uplink slot for uplink data transmission over a Physical Uplink Shared Channel (PUSCH) indicated by the uplink data grant, the signaled information about the unavailable resource elements including:
       at least an indication of at least one Orthogonal Frequency Division Multiplexing (OFDM) symbol;
       at least one bit being associated with an SRS subband; and
       an indication of a zero transmission power in the SRS subband in the at least one OFDM symbol; and
    receiver circuitry configured to receive the PUSCH from the user equipment according to the signaled information in the uplink data grant.

14. The base station of claim 13, wherein the information about the unavailable resource elements includes a bitmap with each bit associated with one SRS resource configuration.

15. The base station of claim 13, wherein the indication of at least one OFDM symbol is configured with SRS.

16. The base station of claim 13, wherein the at least one bit is part of at least one of a bitmap with each bit associated with the SRS subband.

17. A method for base station for receiving uplink data transmission in a wireless network, the method comprising:
    signaling information to the user equipment in an uplink data grant about unavailable resource elements in an uplink slot for uplink data transmission over a Physical Uplink Shared Channel (PUSCH) indicated by the uplink data grant, the signaled information about the unavailable resource elements including:
       at least an indication of at least one Orthogonal Frequency Division Multiplexing (OFDM) symbol;
       at least one bit being associated with an SRS subband; and
       an indication of a zero transmission power in the SRS subband in the at least one OFDM symbol; and
    receiving the PUSCH from the user equipment according to the signaled information in the uplink data grant.

18. The method of claim 17, wherein the information about the unavailable resource elements includes a bitmap with each bit associated with one SRS resource configuration.

19. The method of claim 17, wherein the indication of at least one OFDM symbol is configured with SRS.

* * * * *